(12) United States Patent
Nishizawa et al.

(10) Patent No.: US 10,740,727 B2
(45) Date of Patent: Aug. 11, 2020

(54) TECHNIQUES FOR DETERMINING WHETHER EMPLOYEE ATTENDANCE IS BEING APPROPRIATELY MANAGED

(71) Applicant: Seiko Epson Corporation, Tokyo (JP)

(72) Inventors: Koji Nishizawa, Shiojiri (JP);
Moonhee Lee, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 92 days.

(21) Appl. No.: 15/392,793

(22) Filed: Dec. 28, 2016

(65) Prior Publication Data

US 2017/0185965 A1 Jun. 29, 2017

(30) Foreign Application Priority Data

Dec. 28, 2015 (JP) .................................. 2015-256745
Feb. 10, 2016 (JP) .................................. 2016-023395
Feb. 10, 2016 (JP) .................................. 2016-023396

(51) Int. Cl.
| | | |
|---|---|---|
| *G06Q 10/10* | (2012.01) | |
| *G06Q 20/20* | (2012.01) | |
| *G07G 1/00* | (2006.01) | |

(52) U.S. Cl.
CPC ....... *G06Q 10/1091* (2013.01); *G06Q 20/209* (2013.01); *G07G 1/0045* (2013.01)

(58) Field of Classification Search
CPC ......... G06Q 10/1091; G06Q 10/06398; G06Q 20/209; G05B 2219/32; G05B 2219/32012; G06F 3/1293
See application file for complete search history.

(56) References Cited

U.S. PATENT DOCUMENTS

| | | | | |
|---|---|---|---|---|
| 6,501,558 | B2 * | 12/2002 | Ebina .................. | G06K 15/181 358/1.1 |
| 8,887,992 | B2 * | 11/2014 | Koakutsu ........... | G06Q 10/0832 235/375 |
| 9,111,402 | B1 * | 8/2015 | Krishnan ................. | G07C 1/10 |
| 10,535,024 | B1 * | 1/2020 | Westland ....... | G06Q 10/063116 |
| 2001/0007818 | A1 * | 7/2001 | Ichikawa .............. | G07G 1/145 455/425 |

(Continued)

FOREIGN PATENT DOCUMENTS

| | | |
|---|---|---|
| JP | 2002-024947 A | 1/2002 |
| JP | 2002-056422 A | 2/2002 |

(Continued)

OTHER PUBLICATIONS

Zapier, "An Introduction to APIs", Jul. 7, 2014, zapier.com, chapter 3 (Year: 2014).*

(Continued)

*Primary Examiner* — Florian M Zeender
*Assistant Examiner* — Vanessa Deligi
(74) *Attorney, Agent, or Firm* — Workman Nydegger

(57) ABSTRACT

Printed information related to attendance can be used through an external device. A control server has an attendance manager database storing attendance-related information based on print data instructing printing information related to attendance, and a control server controller. In response to a command from an management device, the control server controller executes a process using the attendance manager database, and sends information indicating the process result to the management device.

5 Claims, 31 Drawing Sheets

(56) References Cited

U.S. PATENT DOCUMENTS

| | | | | |
|---|---|---|---|---|
| 2003/0191700 | A1* | 10/2003 | Horne | G06Q 10/063114 |
| | | | | 705/32 |
| 2008/0065396 | A1* | 3/2008 | Marshall | G06Q 10/10 |
| | | | | 705/16 |
| 2009/0217076 | A1* | 8/2009 | Okuhara | G06Q 10/06 |
| | | | | 713/600 |
| 2010/0235202 | A1* | 9/2010 | Strelling | G06Q 10/06 |
| | | | | 705/7.27 |
| 2011/0087535 | A1* | 4/2011 | Yoshizawa | G06Q 20/20 |
| | | | | 705/14.26 |
| 2011/0125566 | A1* | 5/2011 | McLaughlin | G06Q 20/20 |
| | | | | 705/14.23 |
| 2011/0252118 | A1* | 10/2011 | Pantos | H04L 65/4084 |
| | | | | 709/219 |
| 2012/0323626 | A1* | 12/2012 | Beauregard | G06Q 10/06 |
| | | | | 705/7.18 |
| 2014/0040014 | A1* | 2/2014 | Anand | G06Q 30/06 |
| | | | | 705/14.45 |
| 2014/0067499 | A1* | 3/2014 | Stepanovich | G06Q 30/0214 |
| | | | | 705/14.16 |
| 2016/0283867 | A1 | 9/2016 | Sasaki et al. | |
| 2016/0292647 | A1* | 10/2016 | Dickerson | G08B 6/00 |
| 2016/0342929 | A1* | 11/2016 | Tanaka | G06Q 10/063116 |

FOREIGN PATENT DOCUMENTS

| | | |
|---|---|---|
| JP | 2002-133056 | 5/2002 |
| JP | 2002-279262 A | 9/2002 |
| JP | 2002304455 | 10/2002 |
| JP | 2003-030706 | 1/2003 |
| JP | 2003-099854 | 4/2003 |
| JP | 2004-326500 A | 11/2004 |
| JP | 2004-341694 A | 12/2004 |
| JP | 2005-343028 A | 12/2005 |
| JP | 2006-318158 A | 11/2006 |
| JP | 2009-151518 | 7/2009 |
| JP | 2012-027633 A | 2/2012 |
| JP | 2012-038130 A | 2/2012 |
| JP | 2012-098981 A | 5/2012 |
| JP | 5093735 B1 | 12/2012 |
| JP | 2014-044467 A | 3/2014 |
| JP | 2014-093032 | 5/2014 |
| JP | 2015-038677 A | 2/2015 |
| JP | 2015095178 | 5/2015 |
| JP | 2015-212975 | 11/2015 |
| JP | 2015-222497 | 12/2015 |
| WO | 2012-173047 A1 | 12/2012 |

OTHER PUBLICATIONS

Surfwtw, "MS Excel 2010 Tutorial: Employee Sales Performance Report, Analysis & Evaluation—Part 1", May 20, 2012, YoutTube, https://www.youtube.com/watch?v=FoAky6T6TRE,). (Year: 2012).*

Surfwtw, "MS Excel 2010 Tutorial: Employee Sales Performance Report, Analysis & Evaluation—Part 1", May 20, 2012, YoutTube, https://www.youtube.corn/watch?v=FoAky6T6TRE, (Year: 2012).*

* cited by examiner

R1

XXX STORE ←— J1

CITY XXX
TEL (XX)XX-XXXX ←— J2

Check# : C0001 ←— J3
1/1/2015/12:00:00 ←— J4

| J51 | J52 | J53 |
| 2 | APPLE-1 | 10.00 ←— J5 |
| 1 | TOY-1 | 60.00 ←— J5 |
| J51 | J52 | J53 |

SUBTOTAL         70.00 ←— J6
TAX               6.13 ←— J7
AMOUNT         $ 76.13 ←— J8

| J10 | J9 | J3 | J4 | J5 LINE ITEM INFORMATION | | | J5 LINE ITEM INFORMATION | | | ... | J5 | J6 | J7 | J8 |
|---|---|---|---|---|---|---|---|---|---|---|---|---|---|---|
| BATCH IDENTIFIER | SERIAL NUMBER | RECEIPT IDENTIFIER | RECEIPT DATE INFORMATION | PURCHASED QUANTITY INFORMATION | PRODUCT NAME INFORMATION | UNIT PRICE INFORMATION | PURCHASED QUANTITY INFORMATION | PRODUCT NAME INFORMATION | UNIT PRICE INFORMATION | ... | LINE ITEM INFORMATION | SUBTOTAL INFORMATION | TAX INFORMATION | TRANSACTION TOTAL INFORMATION |
| | | | | J51 | J52 | J53 | J51 | J52 | J53 | | | | | |

G101

```
https://~                                    _ □ ×
```

EMPLOYEE IDENTIFIER :P0001

ATTENDANCE FROM 2015.1.1 TO 2015.1.3

| 2015.1.1 | IN  | 10:00 |             |
|          | OUT | 14:00 |             |
|          | IN  | 15:00 |             |
|          | OUT | 18:00 | TOTAL 7 HRS |

| 2015.1.2 | IN  | 10:00 |             |
|          | OUT | 14:00 | TOTAL 4 HRS |

| 2015.1.3 | IN  | 15:00 |             |
|          | OUT | 18:00 | TOTAL 3 HRS |

TOTAL 14 HRS

```
https://~                                    _ □ ×
```

SHOP IDENTIFIER: S0001

ATTENDANCE FROM 2015.1.1 TO 2015.1.2

2015.1.1
EMPLOYEE IDENTIFIER: P0001　　IN　　10:00
　　　　　　　　　　　　　　　OUT　 14:00　TOTAL 4 HRS
EMPLOYEE IDENTIFIER: P0002　　IN　　12:00
　　　　　　　　　　　　　　　OUT　 18:00　TOTAL 6 HRS
2015.1.2
EMPLOYEE IDENTIFIER: P0001　　IN　　10:00
　　　　　　　　　　　　　　　OUT　 14:00　TOTAL 4 HRS
EMPLOYEE IDENTIFIER: P0003　　IN　　14:00
　　　　　　　　　　　　　　　OUT　 18:00　TOTAL 4 HRS
　　　　　　　　　　　　　　　　　　　　　　――――――
　　　　　　　　　　　　　　　　　　　　　　18 HRS

FIG. 12

| J712 | J10 | J9 | J711 | J714 |
|---|---|---|---|---|
| RECORD IDENTIFIER | BATCH IDENTIFIER | SERIAL NUMBER | DRAWER-RELATED INFORMATION | DRAWER VIDEO DATA |

FIG. 18

ORDER TICKET

SEATING IDENTIFIER: S0001 } A51

OO PASTA    1
XX RICE     1      } A52
BEER        1
COFFEE      1

621

| SEATING IDENTIFIER | AVAILABILITY |
|---|---|
| S0001 | OCCUPIED |
| S0002 | AVAILABLE |
| S0003 | OCCUPIED |
| S0004 | AVAILABLE |

RECEIPT

```
SEATING IDENTIFIER: S0001          } A81

OO PASTA    1      @800

XX RICE     1      @500
                                   } A82
BEER        1      @500

COFFEE      1      @300
------------------------------
              SUBTOTAL   2100
                   TAX    168
                 TOTAL   2268
```

FIG. 29

TECHNIQUES FOR DETERMINING WHETHER EMPLOYEE ATTENDANCE IS BEING APPROPRIATELY MANAGED

1. CROSS-REFERENCE TO RELATED APPLICATIONS

This application claims priority under 35 U.S.C. § 119 to Japanese Patent Application No. 2015-256745 filed on Dec. 28, 2015, No. 2016-023395 filed on Feb. 10, 2016, and No. 2016-023396 filed on Feb. 10, 2016, the entire disclosure of which is expressly incorporated by reference herein.

2. TECHNICAL FIELD

The present invention relates to an information processing device, an information processing system, and a control method of an information processing device.

3. RELATED ART

Technology for converting output data output from a transaction processing unit of a POS terminal to a data format that can be understood by an external device, sending the converted data to the external device, and managing the transmitted data on the external device is described in JP-A-2012-27633, for example.

A POS terminal such as described in JP-A-2012-27633 is typically installed in a store. Network systems having multiple printers installed in a business having multiple seats for customers, and configured such that one printer prints receipts based on customer transactions, and a different printer prints order tickets on which information representing the content of a customer order is printed based on a customer's order, are also known.

Printers in a business may also print information related to the attendance of employees working in the business. By the printer printing information related to attendance, the employee and business managers can easily and accurately get work-related information, and recording media on which the attendance information is recorded can be stored. The attendance information printed by the printer also contains information that is useful (valuable) for business operations and business management, and can preferably also be used through an external device.

One objective of at least one embodiment of the invention is therefore to enable using printed attendance information through an external device.

A cash drawer may also be connected as a device to the printer. For example, by connecting a cash drawer to a printer that is installed at a checkout counter where transactions are processed in the business and prints receipts, and receipt printing and the cash drawer can be controlled through an external device such as the POS terminal described in JP-A-2012-27633. In a network system having a printer with a cash drawer connected thereto, it is also desirable to execute useful processes using the ability of the printer to control the cash drawer as controlled by the external device.

Another objective of at least one embodiment of the invention is to provide a network system having a printer to which a cash drawer is connected that can execute useful processes using the ability of the printer to control the cash drawer as controlled by an external device.

It is also desirable for a network system such as described above to enable appropriately managing the use of seats so that customers can be guided smoothly to their seats.

Another objective of at least one embodiment of the invention is to enable a network system having a receipt printer for printing receipts, and a ticket printer for printing order tickets, to accurately manage use of seats in the business.

SUMMARY

An information processing device according to at least one embodiment of the invention has an attendance manager database configured to store attendance-related information based on print data instructing printing the attendance-related information; and a controller configured to execute a process based on the attendance manager database in response to a command from an external device, and send information indicating a process result to the external device.

By sending a command to the information processing device, the external device can acquire attendance-related information based on the attendance manager database, and can display information based on the acquired information, or execute a process based on the acquired information such as storing data. Printed information related to attendance can therefore be used through the external device.

In an aspect of at least one embodiment of the invention, the attendance manager database stores, based on the print data, an employee identifier identifying an employee relationally to the attendance information related to the attendance of the employee. The controller, when response request information including the employee identifier and requesting information related to the attendance of the employee is received from the external device, extracts the attendance management information from the attendance manager database, and generates and sends to the external device information related to the attendance of the employee based on the extracted attendance management information.

This aspect enables the external device to acquire information related to the attendance of a specific employee by a function of the information processing device.

In an aspect of at least one embodiment of the invention, a plurality of API (Application Programming Interfaces) are stored; the response request information includes API call information specifying an API; and the controller generates information related to the attendance of the employee by the API specified by the API call information.

This aspect enables the external device to easily acquire information related to the attendance of a specific employee using an API registered in the information processing device.

In an aspect of at least one embodiment of the invention, the attendance manager database stores a store identifier identifying a store relationally to the attendance management information related to the attendance of employees employed at the store. The controller, when response request information including the store identifier and requesting information related to the attendance of employees employed at the store is received from the external device, extracts the attendance management information from the attendance manager database, and generates and sends to the external device information related to the attendance of employees employed at the store based on the extracted attendance management information.

This aspect enables the external device to acquire information related to the attendance of a specific employee in a specific store by a function of the information processing device.

In an aspect of at least one embodiment of the invention, a plurality of API (Application Programming Interfaces) are stored; the response request information includes API call information specifying an API; and the controller generates information related to the attendance of employees employed at the store by the API specified by the API call information.

This aspect enables the external device to easily acquire information related to the attendance of employees working in a specific store using an API registered in the information processing device.

In an aspect of at least one embodiment of the invention, a transaction information manager database stores transaction-related information that is printed on receipts based on the attendance manager database and receipt production command data instructing printing receipts. The controller displays, in response to a command from the external device, a screen presenting the transaction-related information and attendance-related information on the external device based on the transaction information manager database.

This aspect enables a person viewing the screen displayed on the external device to see the relationship between transaction-related information and attendance-related information.

In an aspect of at least one embodiment of the invention, the attendance manager database is compiled from the print data transmitted by the printer, or data based on the print data.

This aspect can appropriately compile an attendance manager database from print data received from a printer, or data based on the print data.

In an aspect at least one embodiment of the invention, the printer prints the attendance-related information based on the print data.

Because the printer in this aspect of the invention prints attendance-related information, the employee or a store manager, for example, can easily acquire attendance-related information, and recording media recording attendance-related information can be stored.

Another aspect of at least one embodiment of the invention is an information processing system including an external device; and an information processing device configured to communicate with the external device. The information processing device, based on an attendance manager database configured to store attendance-related information based on print data instructing printing the attendance-related information, executes a process in response to a command from an external device, and sends information indicating a process result to the external device.

By sending a command to the information processing device, the external device can acquire attendance-related information based on the attendance manager database, and can display information based on the acquired information, or execute a process based on the acquired information such as storing data. Printed information related to attendance can therefore be used through the external device.

Another aspect of at least one embodiment of the invention is a control method of an information processing device, comprising executing a process in response to a command from an external device, and sending information indicating a process result to the external device, based on an attendance manager database relationally storing attendance-related information based on print data instructing printing attendance-related information.

By sending a command to the information processing device, the external device can acquire attendance-related information based on the attendance manager database, and can display information based on the acquired information, or execute a process based on the acquired information such as storing data. Printed information related to attendance can therefore be used through the external device.

Another aspect of at least one embodiment of the invention is a network system including a printer to which a cash drawer and external device can connect, and a server that communicates with the printer through a network. When a control command instructing opening the cash drawer is received from the external device, the printer sends, to the server, drawer-related information including at least information indicating that the control command was received. When the drawer-related information is received, the server executes a process based on the received drawer-related information.

When the printer controls the cash drawer as controlled by the external device, the server can receive the drawer-related information from the printer, and based on the received drawer-related information, can execute useful processes such as managing and providing information related to the cash drawer.

In an aspect of at least one embodiment of the invention, when the drawer-related information is received, the server stores the received drawer-related information relationally to a printer identifier identifying the printer that sent the drawer-related information; and when response request information including the printer identifier and requesting information related to the cash drawer is received, returns information related to the cash drawer based on the printer identifier and the related drawer-related information.

The server in this configuration can provide, in response to a query, information related to a cash drawer connected to a specific printer.

In an aspect of at least one embodiment of the invention, the drawer-related information includes information indicating when the control command was received; and the server, when the response request information is received, based on the drawer-related information related to the printer identifier contained in the response request information, returns information indicating when the cash drawer was open during a specific time.

The server in this configuration can provide useful information, such as information indicating when the cash drawer was open during a specific time, based on the drawer-related information received from the printer.

In an aspect of the invention, the server is connected to a processing device through the network, and when the drawer-related information is received, can control the processing device based on the received drawer-related information.

Synchronized to when the cash drawer connected to the printer opens, the server in this configuration can cause the external device to execute a specific process.

In an aspect of at least one embodiment of the invention, the processing device is a camera that can image the cash drawer connected to the printer, and when the drawer-related information is received, the server causes the camera to start imaging.

The server in this configuration can control the camera to image the cash drawer when, for example, the cash drawer is open and money can be removed from or put into the cash drawer.

Another aspect of at least one embodiment of the invention is a control method of a network system including a printer to which a cash drawer and external device can connect, and a server that communicates with the printer through a network. When a control command instructing opening the cash drawer is received from the external device, the printer sends, to the server, drawer-related information including at least information indicating that the control command was received. When the drawer-related information is received, the server executes a process based on the received drawer-related information.

When the printer controls the cash drawer as controlled by the external device, the server can receive the drawer-related information from the printer, and based on the received drawer-related information, can execute useful processes such as managing and providing information related to the cash drawer.

Another aspect of at least one embodiment of the invention is a network system including a receipt printer, ticket printer, and server connected to the receipt printer and the ticket printer. The receipt printer is located in a business having multiple seats that can be used by customers, and, based on a first control command that is received, produces receipts printed with at least transaction-related information and a first seating identifier identifying the seat used by the customer. The ticket printer is also located in the business, and based on a received second control command, produces order tickets printed with at least information indicating the content of an order of a customer using a seat, and a second seating identifier identifying the seat used by the customer. When the receipt printer receives the first control command, the receipt printer sends the first seating identifier to the server based on the received first control command. When the ticket printer receives the second control command, the ticket printer sends the second seating identifier to the server based on the received second control command. The server manages the use of seats in the business by customers based on the received first seating identifier and second seating identifier.

The server in this configuration acquires the seating identifier of a particular seat when the customer using the seat places an order, and when the customer using the seat pays for the order. As a result, based on the received seating identifiers, the sever can manage the period from when the customer using the seat places an order and when the customer pays for the order, and can therefore desirably manage the use, or availability, of seats in the business.

In an aspect of at least one embodiment of the invention, the server stores, relationally to a third seating identifier corresponding to the first seating identifier and the second seating identifier, seat occupancy information indicating if the seat is in use or the seat is not in use; when the second seating identifier is received from the ticket printer, sets the seat occupancy information identified by the third seating identifier corresponding to the second seating identifier to a value indicating the seat is in use; and when the first seating identifier is received from the receipt printer, sets the seat occupancy information identified by the third seating identifier corresponding to the first seating identifier to a value indicating the seat is not in use.

The server in this configuration can accurately manage the use of seats based on the seat occupancy information relationally stored to the third seating identifier.

In an aspect of at least one embodiment of the invention, the server stores, for seats in the business, a third seating identifier corresponding to the first seating identifier and second seating identifier, and seat occupancy information indicating the number of people that can use that seat; when the second seating identifier and information indicating the number of people seated at the seat of the second seating identifier is received from the ticket printer, updates, based on the number of people seated, the seat occupancy information related to the third seating identifier corresponding to the received second seating identifier; and when the first seating identifier and information indicating the number of people that vacated the seat of the first seating identifier are received from the receipt printer, updates, based on the number of people that vacated seats, the seat occupancy information related to the third seating identifier corresponding to the received first seating identifier.

The server in this configuration can accurately manage the use of seats, and more particularly the number of people that can use available seats, based on the seat occupancy information relationally stored to the third seating identifier.

In an aspect of at least one embodiment of the invention, the server sends to an external device information indicating the use of seats in a business, and displays information indicating the use of seats to the external device.

This configuration enables the user to easily and accurately know the use of seats by referring to the information displayed on the external device.

Another aspect of at least one embodiment of the invention is a control method of a network system including a receipt printer, ticket printer, and server connected to the receipt printer and the ticket printer. The receipt printer is located in a business having multiple seats that can be used by customers, and, based on a first control command that is received, produces receipts printed with at least transaction-related information and a first seating identifier identifying the seat used by the customer. The ticket printer is also located in the business, and based on a received second control command, produces order tickets printed with at least information indicating the content of an order of a customer using a seat, and a second seating identifier identifying the seat used by the customer. The control method includes: when the receipt printer receives the first control command, the receipt printer sending the first seating identifier to the server based on the received first control command; when the ticket printer receives the second control command, the ticket printer sending the second seating identifier to the server based on the received second control command; and the server managing the use of seats in the business by customers based on the received first seating identifier and second seating identifier.

The server in this configuration acquires the seating identifier of a particular seat when the customer using the seat places an order, and when the customer using the seat pays for the order. As a result, based on the received seating identifiers, the sever can manage the period from when the customer using the seat places an order and when the customer pays for the order, and can therefore desirably manage the use (availability) of seats in the business.

In an aspect of at least one embodiment of the invention, the server stores, relationally to a third seating identifier corresponding to the first seating identifier and the second seating identifier, seat occupancy information indicating if the seat is in use or the seat is not in use; when the second seating identifier is received from the ticket printer, sets the seat occupancy information identified by the third seating identifier corresponding to the second seating identifier to a value indicating the seat is in use; and when the first seating identifier is received from the receipt printer, sets the seat occupancy information identified by the third seating identifier corresponding to the first seating identifier to a value indicating the seat is not in use.

The server in this configuration can accurately manage the use of seats based on the seat occupancy information relationally stored to the third seating identifier.

In an aspect of at least one embodiment of the invention, the server stores, for seats in the business, a third seating identifier corresponding to the first seating identifier and second seating identifier, and seat occupancy information indicating the number of people that can use that seat; when the second seating identifier and information indicating the number of people seated at the seat of the second seating identifier is received from the ticket printer, updates, based on the number of people seated, the seat occupancy information related to the third seating identifier corresponding to the received second seating identifier; and when the first seating identifier and information indicating the number of people that vacated the seat of the first seating identifier are received from the receipt printer, updates, based on the number of people that vacated seats, the seat occupancy information related to the third seating identifier corresponding to the received first seating identifier.

The server in this configuration can accurately manage the use of seats, and more particularly the number of people that can use available seats, based on the seat occupancy information relationally stored to the third seating identifier.

In an aspect of at least one embodiment of the invention, the server sends to an external device information indicating the use of seats in a business, and displays information indicating the use of seats to the external device.

This configuration enables the user to easily and accurately know the use of seats by referring to the information displayed on the external device.

BRIEF DESCRIPTION OF THE DRAWINGS

FIG. 4 shows an example of a receipt;

FIG. 5 shows an example of a transaction information manager database;

FIG. 7A shows an example of an attendance sheet for clocking in;

FIG. 10 shows an example of an employee attendance information display screen;

FIG. 12 shows an example of a store attendance information display screen;

FIG. 18 shows an example of a cash drawer manager database;

FIG. 27 shows an example of a seating manager database;

FIG. 29 shows an example of a receipt;

DESCRIPTION OF EMBODIMENTS

Embodiment 1

Preferred embodiments of the present invention are described below with reference to the accompanying figures.

Figure 1:
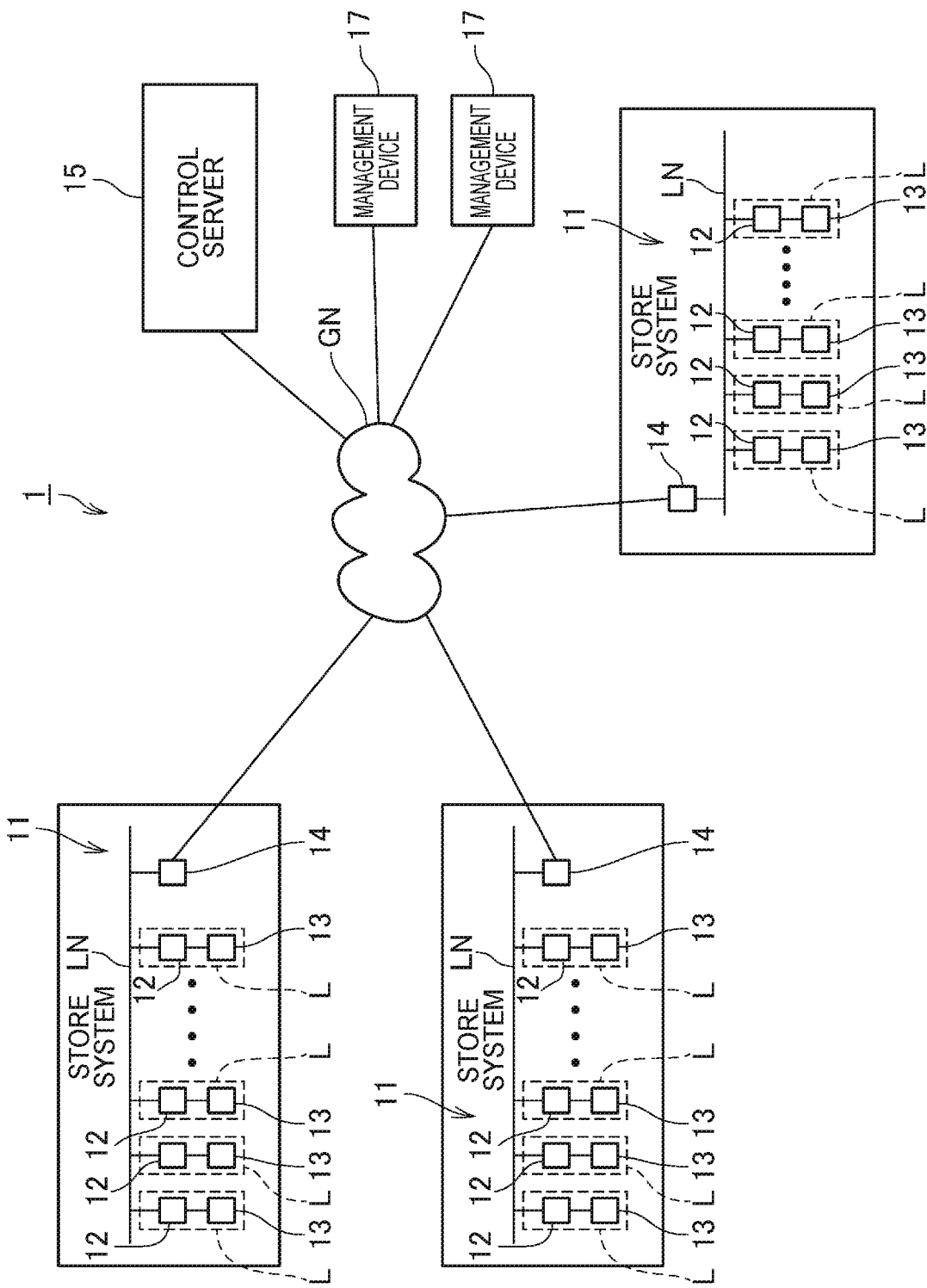
FIG. 1 illustrates the configuration of a transaction processing system according to a first embodiment of the invention.

FIG. 1 shows the configuration of a transaction processing system 1 (information processing system) according to a first embodiment.

As shown in FIG. 1, the transaction processing system 1 includes a plurality of store systems 11. A store system 11 is a system that is used in retail businesses such as supermarkets, convenience stores, department stores, and restaurants. The business may be any facility in which a product is provided and a customer transaction is performed according to provision of the product. In this embodiment, the product is not limited to a physical product supplied to the customer, and means any object that is provided to a customer in exchange for payment, including a service provided to a customer or food or drink provided to a customer.

The store system 11 has functions for processing transactions according to the products purchased by customers, and producing receipts based on the transactions.

A checkout counter L where customer transactions are processed is located in the business where the store system 11 is deployed. A printer 12 capable of recording on roll paper (recording media) is installed at the checkout counter L. A tablet terminal 13 that connects and communicates wirelessly with the printer 12 and controls the printer 12 is also disposed at the checkout counter L.

During a transaction at the checkout counter L, the cash register operator reads barcodes from the products or product packaging using a barcode reader BR connected to the printer 12, and inputs information related to the transaction to the tablet terminal 13. The printer 12 sends data based on reading with the barcode reader BR to the tablet terminal 13.

Based on the data acquired by reading with the barcode reader BR and received from the printer 12, and transaction-related input from the operator, the tablet terminal 13 causes the printer 12 to produce a receipt. The receipt produced by the printer 12 is then given by the operator to the customer.

The configuration, functions, and processes based on the functions of the printer 12 and tablet terminal 13 are described further below.

A local area network LN is deployed in the store system 11.

The printer 12 connects to the local area network LN using a communication protocol used on the LAN.

A communication device 14 is also connected to the local area network LN. The communication device 14 is an interface device that connects to the local area network LN and a global network GN including the Internet, telephone network, and other communication networks. The communication device 14 has the functions of a modem (or ONU (Optical Network Unit)), a router, a NAT (Network Address Translation) unit, and a DHCP (Dynamic Host Configuration Protocol) server. The communication device 14 transfers data that is sent and received between devices when a device connected to the local area network LN and a device connected to the global network GN communicate with each other. Note that the communication device 14 is represented by a single block in FIG. 1, but the communication device 14 may comprise plural devices with different functions.

The printer 12 can also access the global network GN through the communication device 14.

A control server 15 (information processing device) is connected to the global network GN. The control server 15 is a cloud server in a cloud system in which the printer 12 and a management device 17 (external device) described below are clients. More specifically, when triggered by a request from a client, for example, the control server 15 runs a specific computing process. The control server 15 sends data based on the result of the computing process to the client as needed. Note that the control server 15 is represented by a single block in FIG. 1, but this does not mean that the control server 15 is embodied by a single server device. For example, the control server 15 may comprise a plurality of server devices. More specifically, the control server 15 may be configured in any way enabling executing the processes described below.

A management device 17 is also connected to the global network GN.

The management device 17 is a terminal located, for example, in the headquarters of the company that manages the store where the store system 11 is deployed. A person with authority, such as the manager of the store, can use the management device 17 to receive specific services provided by the control server 15. Services provided by the control server 15 are described below.

Figure 2:
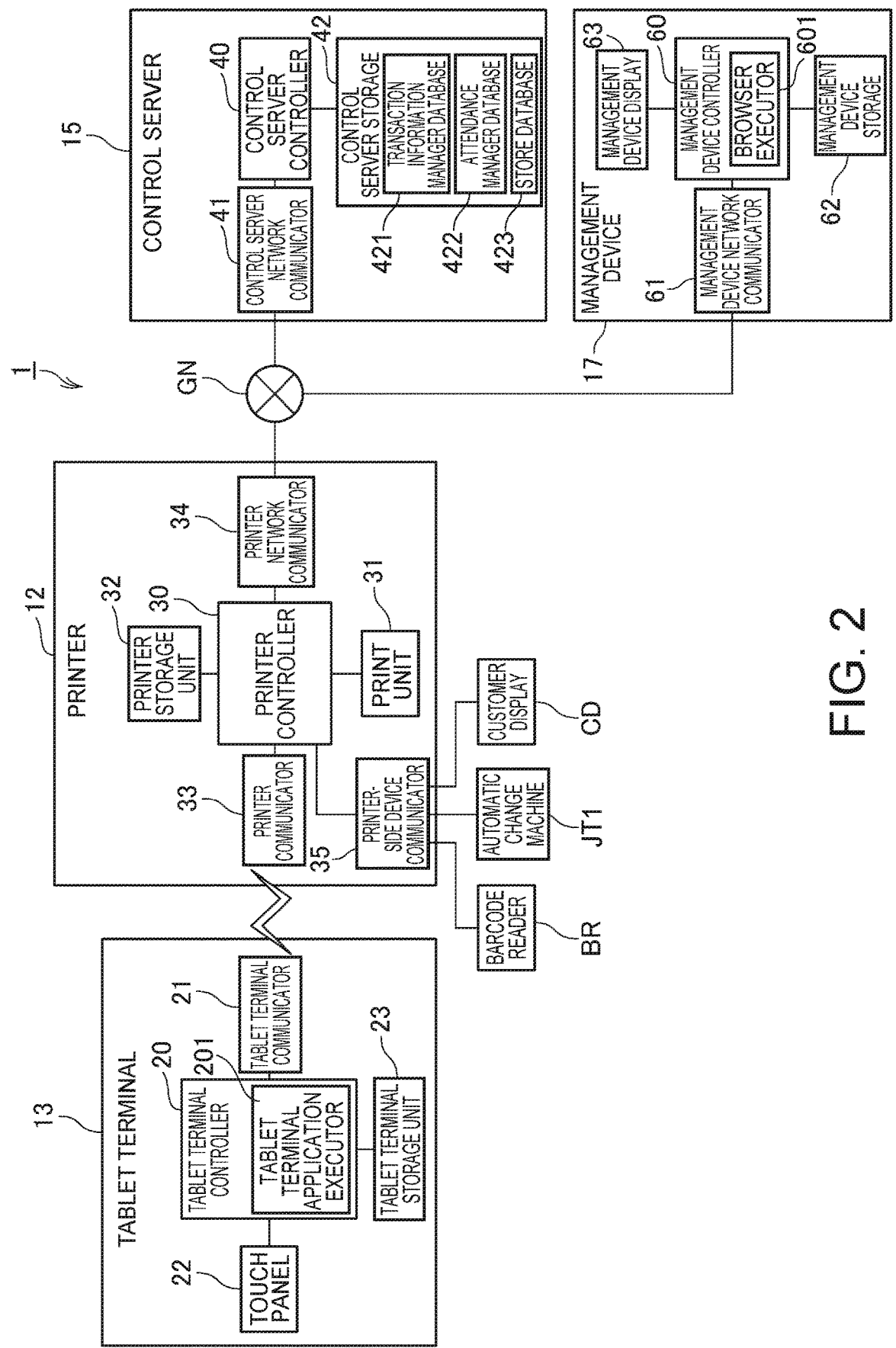
FIG. 2 is a block diagram illustrating the functional configuration of devices in the transaction processing system according to the first embodiment of the invention.

FIG. 2 is a block diagram illustrating the functional configuration of devices in the transaction processing system 1 according to the first embodiment of the invention.

The tablet terminal 13 is a tablet (flat panel) computer with a touch panel 22 covering a large area on the front. When a transaction is processed at the checkout counter L, the tablet terminal 13 functions as a host computer that runs transaction-related processes and controls the printer 12. Though a tablet terminal is described, any computing device with any input peripherals can be implemented.

As shown in FIG. 2, the tablet terminal 13 includes a tablet terminal controller 20, a tablet terminal communicator 21, a touch panel 22, and a tablet terminal storage unit 23.

The tablet terminal controller 20 includes a CPU, ROM, RAM, and other peripheral circuits, and controls the tablet terminal 13. A specific application ("tablet terminal application TAP" below) is preinstalled on the tablet terminal 13. The tablet terminal controller 20 functions as a tablet terminal application executor 201 by reading and running the tablet terminal application TAP and associated programs, and controls other parts of the tablet terminal 13.

The tablet terminal communicator 21 communicates with the printer 12 according to a specific communication protocol as controlled by the tablet terminal controller 20. The wireless communication standard for wireless communication between the tablet terminal 13 and printer 12 may be a wireless LAN standard compatible with an ad hoc mode, a wireless LAN standard compatible with an infrastructure mode, or a near-field communication standard such as Bluetooth®, for example.

The touch panel 22 combines an LCD panel or other type of display panel, and a touch sensor overlaid to the display panel. The display panel displays images as controlled by the tablet terminal controller 20. The touch sensor detects touch operations and outputs to the tablet terminal controller 20. The tablet terminal controller 20 then executes processes appropriate to the touch operation based on input from the touch sensor.

The tablet terminal storage 23 has nonvolatile memory, and stores data.

The printer 12 is a thermal line printer that holds roll paper and forms dots on the stored roll paper with a line thermal head to print images. Alternatively, printer 12 may be another type of printer.

As shown in FIG. 2, the printer 12 has a printer controller 30, print unit, or mechanism, 31, printer storage unit 32, printer communicator 33, printer network communicator 34, and printer-side device communicator 35.

The printer controller 30 includes a CPU, ROM, RAM, and other peripheral circuits, and controls the printer 12. The CPU controls parts of the printer 12 by reading and running firmware stored in ROM or other storage.

The print unit 31 includes mechanisms related to printing on roll paper, such as a conveyance mechanism for conveying roll paper stored inside the cabinet of the printer 12, a printing mechanism for forming dots and printing images on the roll paper with a thermal head, and a cutter mechanism for cutting the roll paper at a specific position. As controlled by the printer controller 30, the print unit 31 conveys the roll paper with the conveyance mechanism, prints receipt-related images on the roll paper by the printing mechanism while, and then cuts the roll paper at a specific position with the cutter mechanism, producing a receipt.

The printer storage 32 has nonvolatile memory and stores data.

The printer communicator 33 communicates with the tablet terminal 13 according to a specific communication protocol as controlled by the printer controller 30.

The printer network communicator 34 communicates with devices connected to the global network GN (including the control server 15) and local area network LN according to a specific communication protocol as controlled by the printer controller 30.

The printer-side device communicator 35 includes an interface board with ports such as a USB port, a serial communication port other than a USB port, or other type of port. A device can connect to each port. The printer-side device communicator 35 communicates with the devices connected to the printer 12 through the ports as controlled by the printer controller 30.

Note that the printer-side device communicator 35 may be configured with a wireless communication capability for communicating wirelessly with devices.

A barcode reader BR, customer display CD, and an automatic change machine JT1 are examples of devices connected to the printer 12 in this example.

The barcode reader BR is used to read barcodes from products and product packaging, and outputs the read result to the printer-side device communicator 35. The printer-side device communicator 35 outputs the data input from the barcode reader BR to the printer controller 30.

The customer display CD displays transaction-related information as controlled by the printer controller 30. The information presented on the customer display CD can be checked by the customer involved in the transaction at the checkout counter L.

The automatic change machine JT1 has a cash receiver for receiving cash inserted by the customer and a cash dispenser for dispensing change according to the amount received, and when cash is input through the cash receiver, the change due is dispensed from the cash dispenser as controlled by the printer controller 30.

The control server 15 is a cloud server to which the printer 12 and management device 17 connect as clients.

As shown in FIG. 2, the control server 15 includes a control server controller 40, control server network communicator 41, and control server storage 42.

The control server controller 40 includes a CPU, ROM, RAM, and other peripheral circuits, and controls the control server 15. The CPU controls parts of the control server 15 by reading and running firmware stored in ROM or other storage.

The control server network communicator 41 communicates with devices connected to the global network GN (including printers 12 and management devices 17) according to a specific communication protocol as controlled by the control server controller 40.

The control server storage 42 stores data (including a transaction information manager database 421, an attendance manager database 422, and a store database 423).

The management device 17 is a device that is managed by the entity that manages the store in which the store system 11 is deployed.

As shown in FIG. 2, the management device 17 includes a management device controller 60, management device network communicator 61, management device storage 62, and management device display 63.

The management device controller 60 includes a CPU, ROM, RAM, and controls the management device 17. A browser is installed on the management device 17. The management device controller 60 functions as a browser executor 601 by reading and running the browser and associated programs, and controls parts of the management device 17.

The management device network communicator 61 communicates with devices connected to the global network GN (including the control server 15) according to a specific communication protocol as controlled by the management device controller 60.

The management device storage 62 stores data.

The management device display 63 includes an LCD panel or other type of display panel, and displays information as controlled by the management device controller 60.

Operation of the tablet terminal 13, printer 12, and control server 15 when a customer transaction is processed at the checkout counter L is described next.

Figure 3:
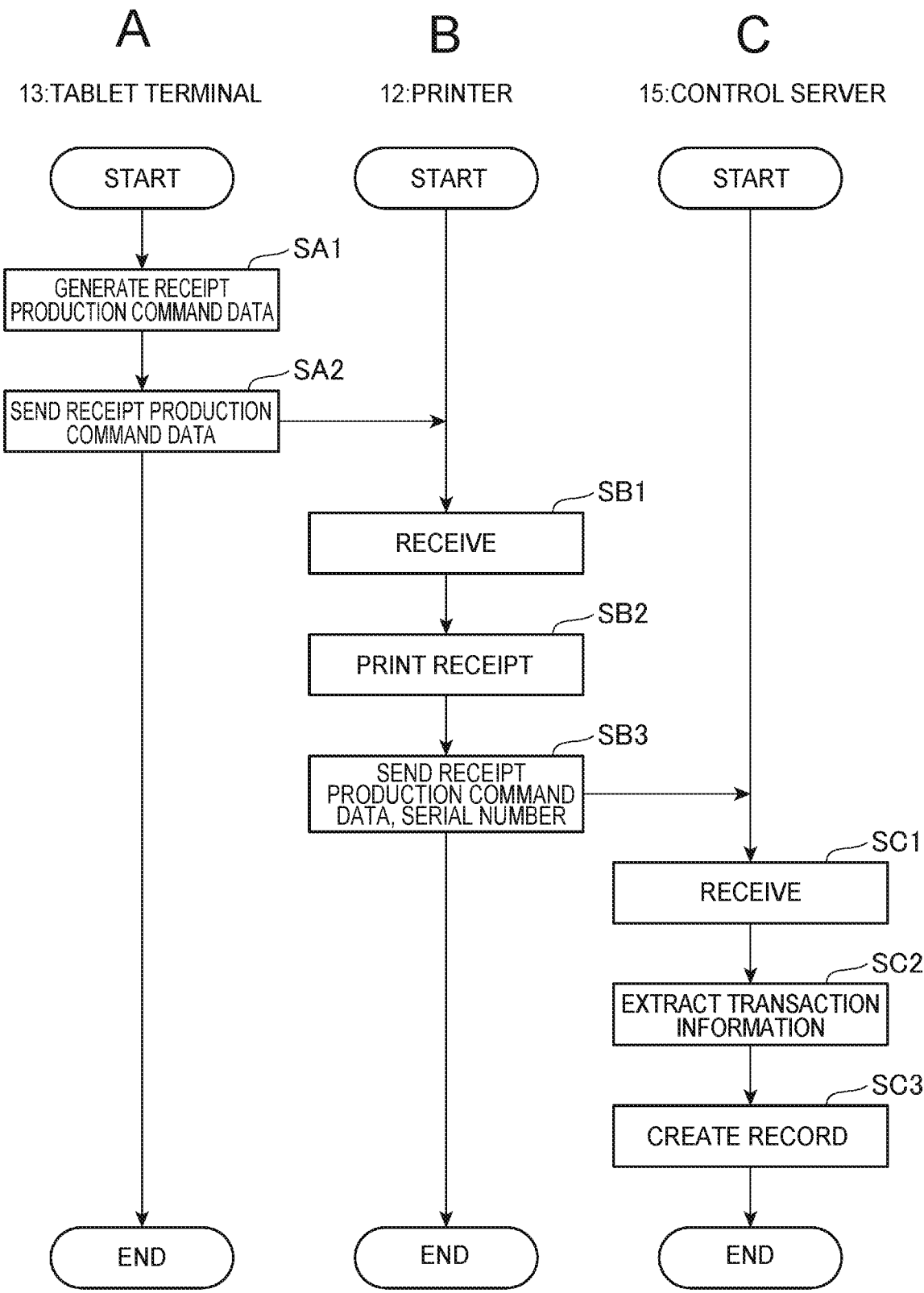
FIG. 3 is a flow chart of the operation of a tablet terminal, printing device, and control server.

FIG. 3 is a flow chart of the operation of the tablet terminal 13, printer 12, and control server 15 when processing a transaction at the checkout counter L. FIG. 3, column A shows the operation of the tablet terminal 13, column B shows the operation of the printer 12, and column shows the operation of the control server 15.

As shown in FIG. 3, column A, the tablet terminal application executor 201 of the tablet terminal controller 20 of the tablet terminal 13 executes a transaction process (payment process) according to the customer transaction, and generates receipt production command data based on the transaction process (step SA1). The receipt production command data is control data instructing producing a receipt.

More specifically, in step SA1, the tablet terminal application executor 201 generates receipt information based on input from the printer 12 (the barcode reader BR connected to the printer 12) and input from the checkout clerk on the touch panel 22 according to the customer transaction. The receipt information is information the printer 12 prints on the produced receipt. The receipt information is described more specifically below.

Next, the tablet terminal application executor 201 generates receipt production command data based on the generated receipt information. The receipt production command data is control data instructing producing a receipt with the receipt information printed according to a specific layout. The receipt production command data includes plural control commands in the command language of the printer 12.

After generating the receipt production command data in step SA1, the tablet terminal application executor 201 controls the tablet terminal communicator 21 to send the generated receipt production command data to the printer 12 (step SA2).

As shown in FIG. 3, column B, the printer controller 30 of the printer 12 controls the printer communicator 33 to receive the receipt production command data (step SB1).

Next, the printer controller 30 controls the print unit 31 to produce a receipt based on the receipt production command data received in step SB1 (step SB2). The resulting receipt is given to the customer.

FIG. 4 shows receipt R1 as an example of a receipt produced by a printer 12 based on the receipt production command data.

Logo information J1 as a graphical representation of the name of the store is printed on the receipt R1 in FIG. 4.

Store information J2 indicating the address and telephone number of the store is also printed on the receipt R1.

Receipt identifier J3 identifying the receipt is also printed on the receipt R1.

Receipt date information J4 indicating when the receipt was produced is also printed on the receipt R1.

One or more lines of line item information J5 containing information related to the products purchased by the customer is also printed on the receipt R1. The line item information J5 includes for each product purchased by the customer: purchase quantity information J51 indicating the purchased quantity of the product, product name information J52 indicating the name of the product, and unit price information J53 indicating the price of the product.

Subtotal information J6 indicating the subtotal is also printed on the receipt R1.

Tax-related information J7 indicating the applicable taxes is also printed on the receipt R1.

Transaction total information J8 identifying the total amount of the transaction is also printed on the receipt R1.

The printer controller 30 prints the information from the logo information J1 to the transaction total information J8 based on the receipt production command data.

Next, the printer controller 30 controls the printer network communicator 34 to send the serial number J9 and the receipt production command data received in step SB1 to the control server 15 (step SB3).

The serial number J9 is identification information uniquely assigned to the printer 12 when the printer 12 is manufactured.

Note that the communication information (information related to the destination, the protocol used for communication, and the format of the transmitted data, for example) required to transmit the serial number J9 and receipt production command data in step SB3 is previously registered in the printer 12.

As shown in FIG. 3, column C, the control server controller 40 of the control server 15 controls the control server network communicator 41 to receive the serial number J9 and the receipt production command data transmitted by the printer 12 (step SC1).

Next, the control server controller 40 extracts the transaction information from the received receipt production command data (step SC2).

The transaction information is a predefined subset of the receipt information printed on the receipt. More specifically, in the sample receipt R1 shown in FIG. 4, the transaction information includes the receipt identifier J3, receipt date information J4, line item information J5 (quantity information J51, product name information J52, unit price information J53), subtotal information J6, tax information J7, and transaction total information J8.

Next, the control server controller 40 accesses the transaction information manager database 421 stored on the control server storage 42, and creates a record in the transaction information manager database 421 based on the serial number J9 received in step SC1 and the transaction information extracted in step SC2 (step SC3).

FIG. 5 schematically illustrates the information contained in a record of the transaction information manager database 421.

As shown in FIG. 5, each record in the transaction information manager database 421 stores a batch identifier J10, serial number J9, receipt identifier J3, receipt date information J4, one or more lines of line item information J5, subtotal information J6, tax information J7, and transaction total information J8.

The batch identifier J10 is identification information identifying a specific receipt (that is, identification information identifying the transaction related to the transaction information). The control server controller 40 generates and includes in each record batch identifier J10 of a unique value according to a specific rule.

Operation of the tablet terminal 13, printer 12, and control server 15 when an employee of the store clocks in to work and when the employee clocks out from work is described next.

Figure 6:
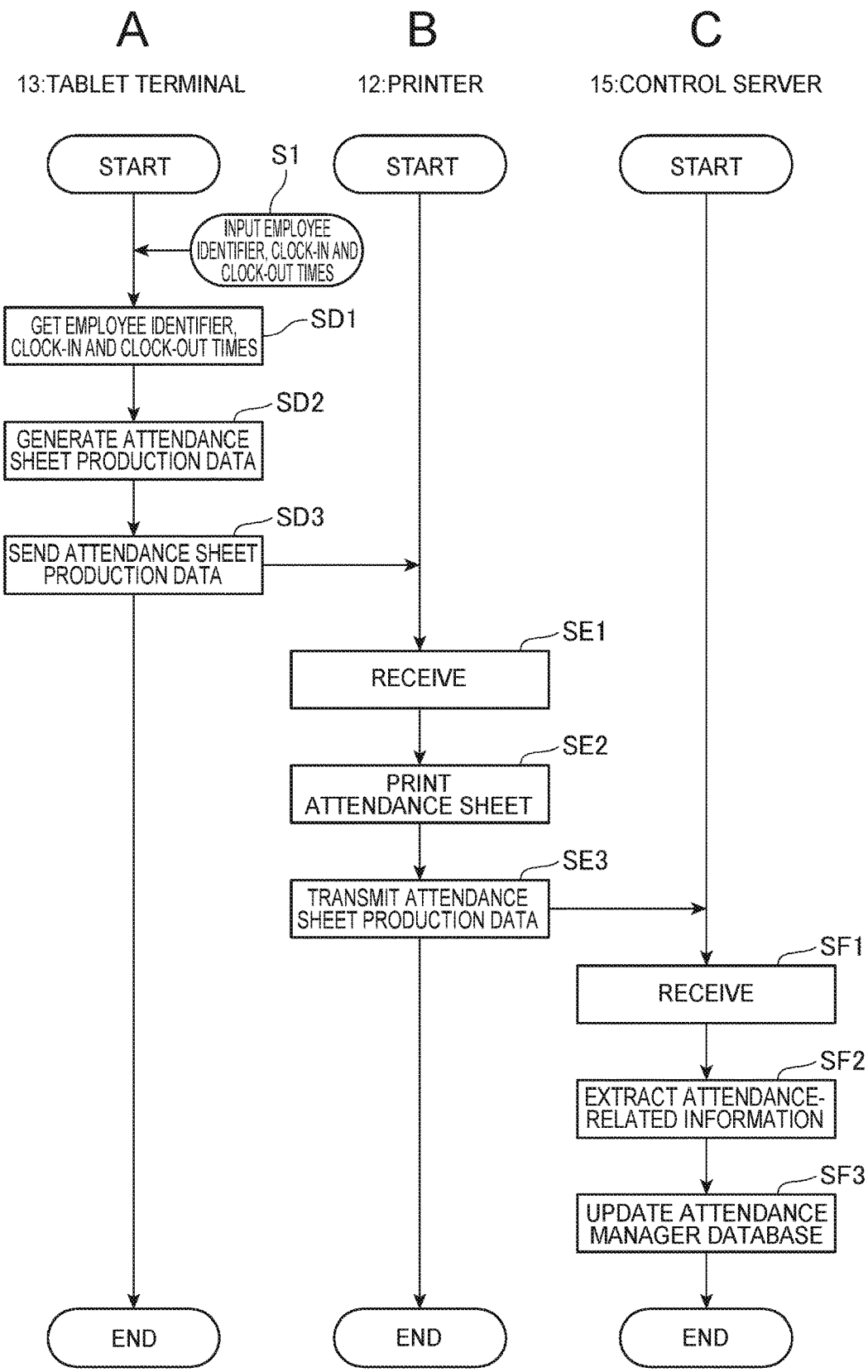
FIG. 6 is a flow chart illustrating the operation of a tablet terminal, printer, and control server.

FIG. 6 is a flow chart of the operation of the tablet terminal 13, printer 12, and control server 15 when an employee of the store clocks in to work and when the employee clocks out from work. FIG. 6 column A shows the operation of the tablet terminal 13, column B shows the operation of the printer 12, and column C shows the operation of the control server 15.

In a store where the store system 11 is deployed, employees of the store perform the following process when clocking in to work and when clocking out from work.

To clock in and to clock out, the employee performs a specific operation instructing the tablet terminal 13 to display a specific user interface related to attendance. In response to this instruction, the tablet terminal controller 20 of the tablet terminal 13 display the specific user interface related to attendance on the touch panel 22.

The terminal operated by the employee does not need to be a tablet terminal 13, but below the employee is a checkout clerk, and the terminal used by the employee to clock in to work and clock out is a tablet terminal 13.

The specific user interface has specific fields for inputting information indicating clocking in and information indicating clocking out, and employee identifier J11 identifying the employee. The employee identifier J11 is previously assigned to the employee.

When clocking in, the employee inputs information indicating clocking in and the employee identifier J11 to the specific user interface, and when clocking out, the employee inputs the information indicating clocking out and employee identifier J11 to the specific user interface (step S1).

Below, the information indicating clocking in and information indicating clocking out are collectively referred to as attendance information.

As shown in FIG. 6 column A, the tablet terminal controller 20 of the tablet terminal 13 acquires the attendance information and employee identifier J11 input to the specific user interface (step SD1).

Next, based on the acquired attendance information and employee identifier J11, the tablet terminal controller 20 generates attendance sheet production data (print data) (step SD2). The attendance sheet production data is control data instructing producing (printing) and attendance sheet. The attendance sheet production data may include multiple control commands in the command language of the printer 12.

Next, the tablet terminal controller 20 controls the tablet terminal communicator 21 to send the generated attendance sheet production data to the printer 12 (step SD3).

As shown in FIG. 6 column B, the printer controller 30 of the printer 12 controls the printer communicator 33 to receive the attendance sheet production data (step SE1).

Next, the printer controller 30 controls the print unit 31 based on the attendance sheet production data to print an attendance sheet (step SE2).

Figure 7A:
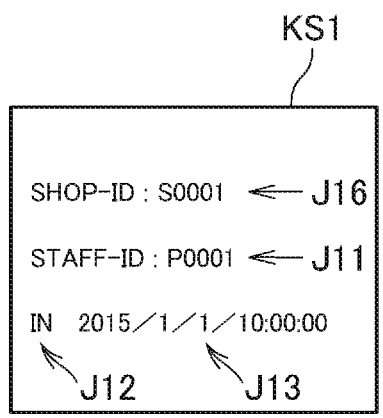
Figure 7B:
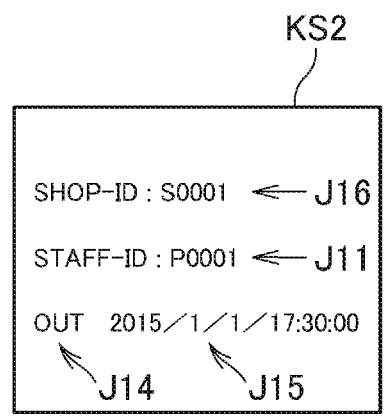
FIG. 7B shows an example of an attendance sheet for clocking out.

FIG. 7A shows an attendance sheet KS1 as an example of an attendance sheet printed when clocking in. FIG. 7B shows an attendance sheet KS2 as an example of an attendance sheet printed when clocking out.

As shown in the attendance sheets KS1, KS2 in FIG. 7A and FIG. 7B, shop identifier J16 and employee identifier J11 are printed on the attendance sheet for clocking in and the attendance sheet for clocking out. The shop identifier J16 is information identifying the specific shop.

As also shown in the attendance sheet KS1 in FIG. 7A, the attendance sheet for clocking in also includes clock-in information J12 ("IN" in FIG. 7A) showing that the employee clocked in. As also shown in the attendance sheet KS1 in FIG. 7A, the attendance sheet for clocking in also includes clock-in time information J13 showing when (the date (year, month, day) and time) the employee clocked in.

As also shown in the attendance sheet KS2 in FIG. 7B, the attendance sheet for clocking out also includes clock-out information J14 ("OUT" in FIG. 7B) showing that the employee clocked out. As also shown in the attendance sheet KS2 in FIG. 7B, the attendance sheet for clocking out also includes clock-out time information J15 showing when (the date (year, month, day) and time) the employee clocked out.

The attendance sheets produced in step SE2 are processed according the specific rules of the shop (business).

For example, the employee may confirm the recorded clock-in time and clock-out time, and keep the attendance sheet. Or, the employee may confirm the recorded clock-in time and clock-out time, and give the attendance sheet to a specific person, such as a manager. In any event, the person that reads the attendance sheet can accurately know when the employee clocked in and clocked out, and can save the attendance sheet as a printed medium.

After producing the attendance sheet, the printer controller 30 controls the printer network communicator 34 to send the attendance sheet production data to the control server 15 (step SE3).

Note that the communication information (information related to the destination, the protocol used for communication, and the format of the transmitted data, for example) required to transmit the attendance sheet production data in step SE3 is previously registered in the printer 12.

As shown in FIG. 6 column C, the control server controller 40 of the control server 15 controls the control server network communicator 41 to receive the attendance sheet production data (step SF1).

Next, the control server controller 40 extracts the attendance-related information from the received attendance sheet production data (step SF2).

The attendance-related information is information related to the attendance recorded on the attendance sheet. More specifically, in the attendance sheet for clocking in, the shop identifier J16, employee identifier J11, clock-in information J12, and clock-in time information J13 are the attendance-related information. In the attendance sheet for clocking out, the shop identifier J16, employee identifier J11, clock-out information J14, and clock-out time information J15 are the attendance-related information.

Next, the control server controller 40, based on the attendance-related information extracted in step SF2, updates a matching record in the attendance manager database 422 (step SF3). This step SF3 is described below.

The attendance manager database 422 has a record for each employee that works in each store.

Figure 8:
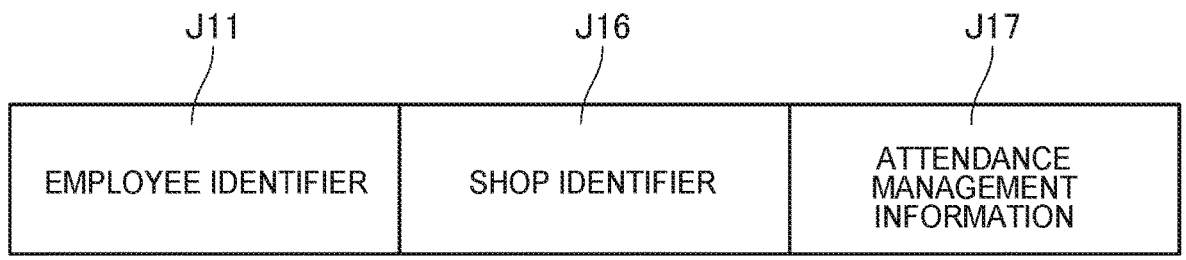
FIG. 8 shows an example of an attendance manager database.

FIG. 8 shows an example of information contained in records in the attendance manager database 422.

As shown in FIG. 8, each record of the attendance manager database 422 stores employee identifier J11 and shop identifier J16.

Each record in the attendance manager database 422 also stores attendance management information J17. The attendance management information J17 cumulatively records information indicating when the employee clocked in to the store and information indicating when the employee clocked out.

In step SF3, the control server controller 40 finds the record (related record) in the attendance manager database 422 with employee identifier J11 of the same value as the employee identifier J11 extracted as attendance-related information in step SF2. Next, the control server controller 40, based on the clock-in information J12 and clock-in time information J13, or the clock-out information J14 and clock-out time information J15, extracted in step SF2, adds the clock-in information J12 and clock-in time information J13, or the clock-out information J14 and clock-out time information J15, to the attendance management information J17.

As described above, in this example, the attendance manager database 422 is updated as the employee clocks in and clocks out from work, and when the employee clocked in and when the employee clocked out is managed by the database.

Processing by the control server 15 based on the transaction information manager database 421 and the attendance manager database 422 is described next.

Multiple Web API s (Application Programming Interfaces) are stored on the control server 15. In response to access from the management device 17, the control server 15 can execute processes through the registered Web APIs and provide required information to users based on the transaction information manager database 421 and attendance manager database 422.

Processes (a first process, second process, and third process) executed by the control server 15 to provide information are described using three examples below.

First Process

The user may want to get information related to the attendance of a specific employee during a specific period of time. By acquiring this information, the actual attendance of a specific employee can be accurately determined.

In this example, when accessed from the management device 17, the control server 15 provides information related to the attendance of a specific employee during a specific period of time as specified by the user using the method described below.

The following example describes operation when the management device 17 accesses the control server 15, but the device used to access the control server 15 is not limited to the management device 17. The device accessing the control server 15 may be any authorized device on which a browser is installed. This also applies to the second and third processes described below.

Figure 9:
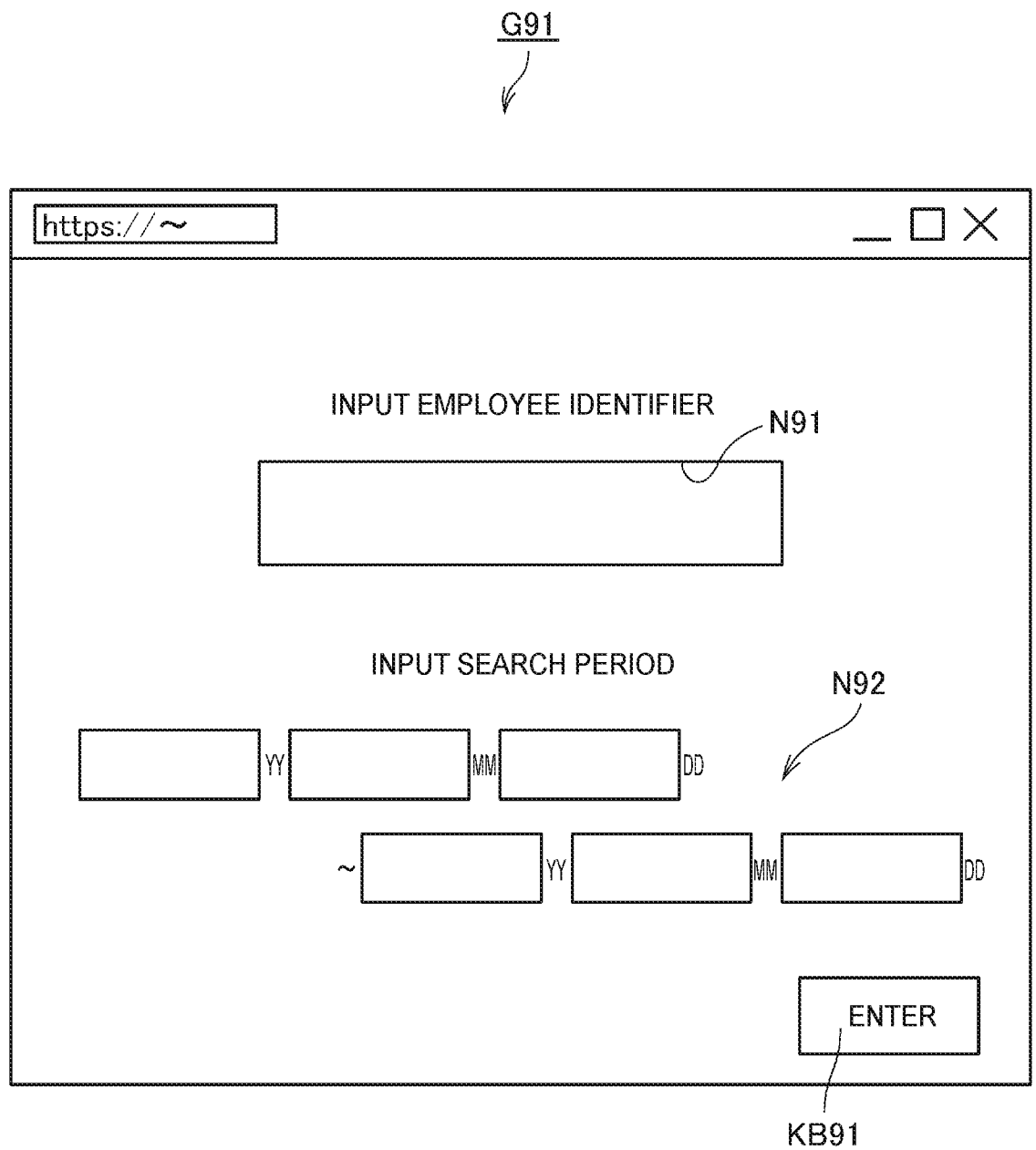
FIG. 9 shows an example of an employee information input screen.

The user starts the browser on the management device 17, and accesses a specific URL on the control server 15 to display the employee information input screen G91, as shown in FIG. 9. The user is previously informed of this URL by a specific method.

The browser executor 601 of the management device controller 60 of the management device 17 accesses the specific URL on the control server 15 in response to the user command. In response to the specific URL being accessed, the control server controller 40 of the control server 15 sends an HTML file for displaying the employee information input screen G91 of FIG. 9 to the management device 17.

The browser executor 601 of the management device 17 then presents the employee information input screen G91, as shown in FIG. 9 based on the received HTML file on the management device display 63.

Note that while not described in detail below, when the control server 15 is accessed from the management device 17, authentication determining if the user is a person with the specific authority is performed appropriately by a specific method.

FIG. 9 shows an example of an employee information input screen G91.

As shown in FIG. 9, the employee information input screen G91 has an employee identifier input field N91. The employee identifier input field N91 is an input field for inputting employee identifier J11. The user inputs to the employee identifier input field N91 the employee identifier J11 of the specific employee for which the attendance-related information is desired.

As shown in FIG. 9, the employee information input screen G91 also has a time period input field N92. The time period input field N92 is an input field for inputting the time period. The user inputs information indicating the time period to the time period input field N92.

Below, the information indicating the time period input to time period input field N92 is referred to as the employee-related period information J18.

As shown in FIG. 9, the employee information input screen G91 also has an Enter button KB91. The Enter button KB91 is a button for confirming input to the employee information input screen G91. The user operates the Enter button KB91 to confirm input to the employee information input screen G91.

When operation of the Enter button KB91 in the employee information input screen G91 is detected, the browser executor 601 of the management device 17 acquires the information input to the input fields of the employee information input screen G91.

Next, the browser executor 601, based on the acquired information, generates an HTTP request, and sends the generated HTTP request to the control server 15. The browser executor 601 generates and sends the HTTP request by a function of a script embedded in the HTML file related to the employee information input screen G91, for example.

The GET method is used on the request line of the HTTP request. The specific URL to access on the control server 15 is recorded as the pathname, and information specifying the specific corresponding Web API (referred to below as the first Web API) is recorded according to a rule, on the request line of the HTTP request. The employee identifier J11 and employee-related period information J18 that are passed as parameters to the first Web API are also recorded according to a specific rule as a query parameter in the pathname.

Note that an HTTP request according to the first Web API is an example of response request information requesting a response related to the attendance of an employee, and including employee identifier and API call information specifying an API.

The control server controller 40 of the control server 15 receives the HTTP request of the first Web API that the management device 17 sent.

Next, the control server controller 40 executes the following process based on the first Web API specified by the received HTTP request, and the query parameters (employee identifier J11 and employee-related period information J18).

More specifically, by a function of the first Web API, the control server controller 40 retrieves the information matching the HTTP request from the attendance manager database 422, generates data ("response data" below) recording the retrieved information in JSON (JavaScript® Object Notation) format, and returns the generated response data in an HTTP response.

Note that the HTTP response and the response data contained in the HTTP response are examples of information indicating the process result.

Describing generating the response data more specifically, the control server controller 40 executes the following process through functions of the first Web API. Specifically, the control server controller 40 finds in the records of the attendance manager database 422 the record storing the same employee identifier J11 as the employee identifier J11 contained in the query parameter. Next, the control server controller 40 gets the attendance management information J17 from the found record. Next, the control server controller 40, based on the attendance management information, acquires the information indicating the clock-in times and the information indicating the clock-out times of the employee during the period indicated by the employee-related period information J18 in the query parameter. Next, the control server controller 40 generates response data recording the acquired information indicating the clock-in times and information indicating the clock-out times in a specific format.

The browser executor 601 of the management device 17 then receives the HTTP response the control server 15 sent.

Next, the browser executor 601, based on the response data contained in the received HTTP response, displays on the management device display 63 an employee attendance information display screen G101 containing at least the information related to the attendance of the employee in the period specified by the user.

FIG. 10 shows an example of an employee attendance information display screen G101.

As shown in FIG. 10, information related to the attendance of the employee in the period specified by the user is displayed in the employee attendance information display screen G101.

In the example in FIG. 10, as the information related to the attendance of the employee, information indicating the clock-in times and information indicating the clock-out times of the employee on each date in the period specified by the user is displayed in the employee attendance information display screen G101. The total time worked by the employee on each date in the period specified by the user is also displayed as information related to the attendance of the employee in the employee attendance information display screen G101. The total time worked by the employee during the period specified by the user is also displayed as information related to the attendance of the employee in the employee attendance information display screen G101.
Second Process The user may want to get information related to the attendance of a specific employee during a specific period of time in a specific store. By acquiring this information, the actual attendance of a specific employee in a specific store can be accurately determined.

In this example, when accessed from the management device 17, the control server 15 provides information related to the attendance of a specific employee during a specific period of time in a specific store as specified by the user using the method described below.

Figure 11:
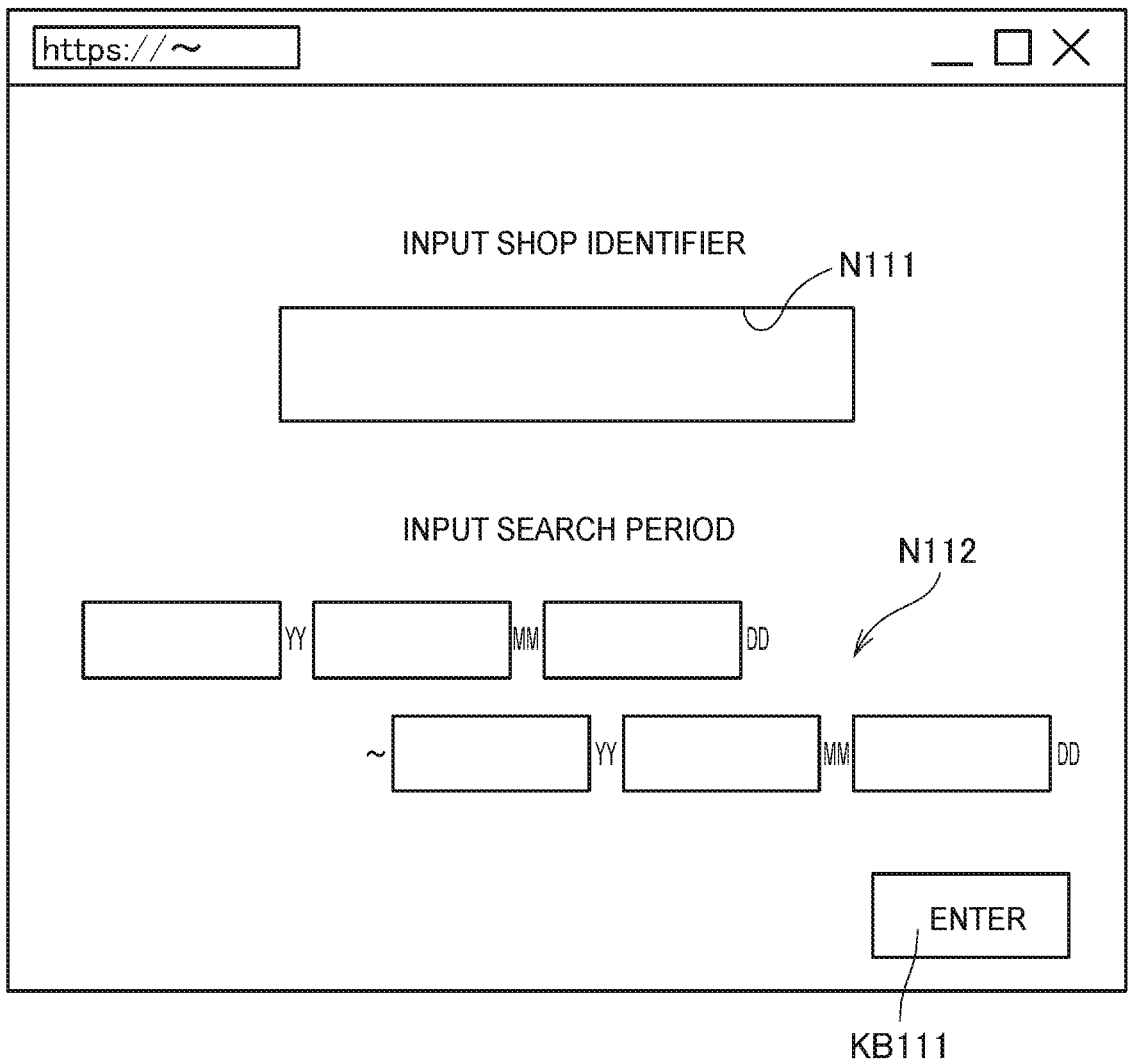
FIG. 11 shows an example of a store information input screen.

The user starts the browser on the management device 17, and accesses a specific URL on the control server 15 to display the store information input screen G111 (FIG. 11). The user is previously informed of this URL by a specific method.

The browser executor 601 of the management device controller 60 of the management device 17 accesses the specific URL on the control server 15 in response to the user command. In response to the specific URL being accessed, the control server controller 40 of the control server 15 sends an HTML file for displaying the store information input screen G111 (FIG. 11) to the management device 17.

The browser executor 601 of the management device 17 then presents the store information input screen G111 (FIG. 11) based on the received HTML file on the management device display 63.

FIG. 11 shows an example of the store information input screen G111.

As shown in FIG. 11, the store information input screen G111 has a shop identifier input field N111. The shop identifier input field N111 is an input field for inputting the shop identifier J16. The user inputs to the shop identifier input field N111 the shop identifier J16 of the specific store (shop) for which the attendance-related information is desired.

As shown in FIG. 11, the store information input screen G111 also has a time period input field N112. The time period input field N112 is an input field for inputting the time period. The user inputs information indicating the time period to the time period input field N112.

Below, the information indicating the time period input to time period input field N112 is referred to as the store period information J19

As shown in FIG. 11, the store information input screen G111 also has an Enter button KB111. The Enter button KB111 is a button for confirming input to the store information input screen G111. The user operates the Enter button KB111 to confirm input to the store information input screen G111.

When operation of the Enter button KB111 in the store information input screen G111 is detected, the browser executor 601 of the management device 17 acquires the information input to the input fields of the store information input screen G111.

Next, the browser executor 601, based on the acquired information, generates an HTTP request, and sends the generated HTTP request to the control server 15. The browser executor 601 generates and sends the HTTP request by a function of a script embedded in the HTML file related to the store information input screen G111, for example.

The GET method is used on the request line of the HTTP request. The specific URL to access on the control server 15 is recorded as the pathname, and information specifying the specific corresponding Web API (referred to below as the second Web API) is recorded according to a rule, on the request line of the HTTP request. The shop identifier J16 and store period information J19 that are passed as parameters to the second Web API are also recorded according to a specific rule as a query parameter in the pathname.

An HTTP request according to the second Web API is an example of response request information requesting a response related to the attendance of an employee, and including shop (store) identifier information and API call information specifying an API.

The control server controller 40 of the control server 15 receives the HTTP request of the second Web API that the management device 17 sent.

Next, the control server controller 40 executes the following process based on the second Web API specified by the received HTTP request, and the query parameters (shop identifier J16, store period information J19).

More specifically, by a function of the second Web API, the control server controller 40 retrieves the information matching the HTTP request from the attendance manager database 422, generates data ("response data" below) recording the retrieved information in JSON format, and returns the generated response data in an HTTP response.

Note that the HTTP response and the response data contained in the HTTP response are examples of information indicating the process result.

Describing generating the response data more specifically, the control server controller 40 executes the following process through functions of the second Web API. Specifically, the control server controller 40 finds in the records of the attendance manager database 422 the one or multiple records storing the same shop identifier J16 as the shop identifier J16 contained in the query parameter. Next, the control server controller 40 gets the employee identifier J11 and attendance management information J17 from the retrieved one or multiple records. Next, the control server controller 40, based on the acquired attendance management information J17 in the retrieved record(s), acquires for each employee the information indicating the clock-in times and the information indicating the clock-out times of the employee during the period indicated by the store period information J19 in the query parameter. Next, the control server controller 40 generates response data recording the acquired employee identifier J11 relationally to the information indicating the clock-in times and information indicating the clock-out times acquired for each employee identified by the employee identifier J11.

The browser executor 601 of the management device 17 then receives the HTTP response the control server 15 sent.

Next, the browser executor 601, based on the response data contained in the received HTTP response, displays on the management device display 63 a store attendance information display screen G121 (FIG. 12) presenting at least the information related to the attendance of the employees of the shop in the period specified by the user.

FIG. 12 shows an example of the store attendance information display screen G121.

As shown in FIG. 12, information related to the attendance of employees of the store in the period specified by the user is displayed in the store attendance information display screen G121.

In the example in FIG. 12, as the information related to the attendance of employees in the store, employee identifier for each employee, information indicating the clock-in times and information indicating the clock-out times of the employee on each date in the period specified by the user are relationally displayed in the store attendance information display screen G121. The cumulative time worked by each employee of the store on each date in the period specified by the user is also displayed as information related to the attendance of the employees of the store in the store attendance information display screen G121. The store attendance information display screen G121 also presents, as information related to the attendance of employees in the store, the total time worked by each employee of the store during the period specified by the user.

Third Process

The user may also want to acquire information related to the relationship between sales in a specific shop and employee attendance during a specific period. Acquiring such information enables knowing the following, for example. Specifically, there is a positive correlation between the amount of sales and how busy a shop is, the shop is busy when sales are high, and the shop is not busy when sales are low. By acquiring information related to the relationship between sales in a specific store and employee attendance in the store, whether or not employee attendance is being appropriately managed can be tested.

In this example, when accessed from the management device 17, the control server 15 provides information related to the relationship between sales in a specific store and employee attendance in the store based on the transaction information manager database 421 and attendance manager database 422 using the method described below.

Below, the information related to the relationship between sales in a specific store and employee attendance in the store provided by the control server 15 is, more specifically, information indicating, for each time period on a specific date specified by the user, store sales during each time period and the number of employees working during each time period.

In the example described below, each store opens at 10:00 and closes at 20:00 (all times shown below in 24-hour time notation). Each day is further divided into three time periods, 10:00-13:00 (referred to below as the first shift), 13:00-17:00 (second shift), and 17:00-20:00 (third shift).

Figure 13:
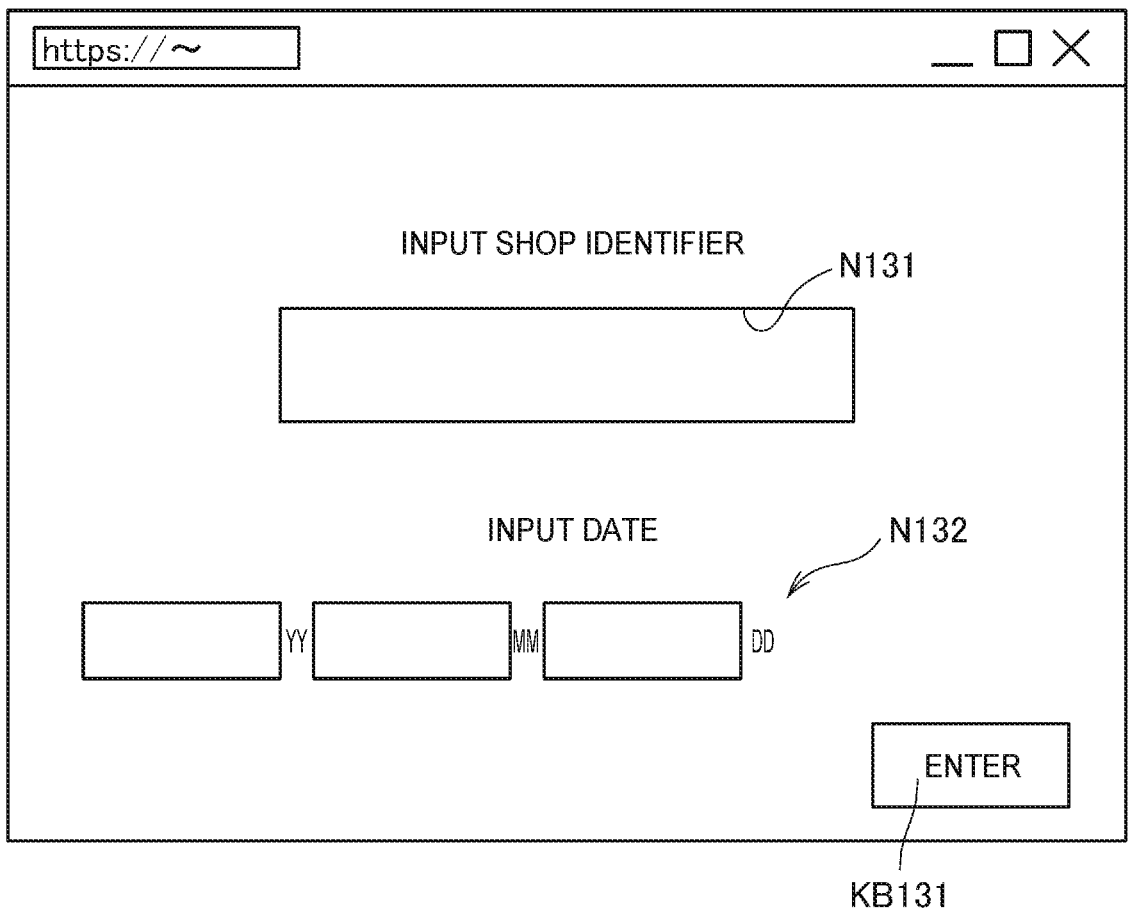
FIG. 13 shows an example of a sales-related information input screen.

The user starts the browser on the management device 17, and accesses a specific URL on the control server 15 to display the sales-related information input screen G131 (FIG. 13). The user is previously informed of this URL by a specific method.

The browser executor 601 of the management device controller 60 of the management device 17 accesses the specific URL on the control server 15 in response to the user command. In response to the specific URL being accessed, the control server controller 40 of the control server 15 sends an HTML file for displaying the sales-related information input screen G131 (FIG. 13) to the management device 17.

The browser executor 601 of the management device 17 then presents the sales-related information input screen G131 (FIG. 13) based on the received HTML file on the management device display 63.

FIG. 13 shows an example of a sales-related information input screen G131.

As shown in FIG. 13, the sales-related information input screen G131 has a shop identifier input field N131. The shop identifier input field N131 is a field for inputting a shop identifier J16. The user inputs to the shop identifier input field N131 the shop identifier J16 of the specific store (shop) for which specific information is desired.

As shown in FIG. 13, the sales-related information input screen G131 has a date input field N132. The date input field N132 is an input field for inputting information indicating the date of the specific day for which specific information is to be acquired. The user inputs information indicating the date to the date input field N132.

The information indicating the date input to the date input field N132 is referred to below as the sale date information J20.

As shown in FIG. 13, the sales-related information input screen G131 also has an Enter button KB131. The Enter button KB131 is a button for confirming input to the sales-related information input screen G131. The user operates the Enter button KB131 to confirm input to the sales-related information input screen G131.

When operation of the Enter button KB131 in the sales-related information input screen G131 is detected, the browser executor 601 of the management device 17 acquires the information input to the input fields of the sales-related information input screen G131.

Next, the browser executor 601, based on the acquired information, generates an HTTP request, and sends the generated HTTP request to the control server 15. The browser executor 601 generates and sends the HTTP request by a function of a script embedded in the HTML file related to the sales-related information input screen G131, for example.

The GET method is used on the request line of the HTTP request. The specific URL to access on the control server 15 is recorded as the pathname, and information specifying the specific corresponding Web API (referred to below as the third Web API) is recorded according to a rule, on the request line of the HTTP request. The shop identifier J16 and sale date information J20 that are passed as parameters to the third Web API are also recorded according to a specific rule as a query parameter in the pathname.

The control server controller 40 of the control server 15 receives the HTTP request of the third Web API that the management device 17 sent.

Next, the control server controller 40 executes the following process based on the third Web API specified by the received HTTP request, and the query parameters (shop identifier J16, sale date information J20).

More specifically, by a function of the third Web API, the control server controller 40 retrieves the information matching the HTTP request from the attendance manager database 422, generates data ("response data" below) recording the retrieved information in JSON format, and returns the generated response data in an HTTP response.

Note that the HTTP response and the response data contained in the HTTP response are examples of information indicating the process result.

Describing generating the response data more specifically, the control server controller 40 executes the following process through functions of the third Web API.

More specifically, the control server storage 42 of the control server 15 stores a store database 423 of records relating, for each shop, the shop identifier J16 of the shop, and the serial numbers J9 of printers 12 in each shop.

The control server controller 40 references the store database 423 to get the serial number J9 of each printer 12 in the shop specified by the user. Next, the control server controller 40 references the transaction information manager database 421 to calculate, based on the acquired serial number J9 and the sale date information J20 in the query parameter, sales in the store in each of the first to third shifts.

Each record in the transaction information manager database 421 contains receipt date information J4, which is information enabling identifying the shift in which a transaction was made, and transaction total information J8, which can be used to calculate sales during each shift in a particular store. The control server controller 40 can therefore calculate store sales in each of the first to third shifts based on the transaction information manager database 421.

Next, the control server controller 40 finds in the records of the attendance manager database 422 the one or multiple records storing the same shop identifier J16 as the shop identifier J16 contained in the query parameter. Next, the control server controller 40 gets the attendance management information J17 from the retrieved one or multiple records. Next, the control server controller 40, based on the acquired attendance management information J17 in the retrieved record(s), acquires the number of employees that were working in the store in each of the first to third shifts on the date specified by the user. The control server controller 40 determines that, if one manager was working for at least a previously set length of time during any one shift, that manager was working during that shift.

Next, the control server controller 40 generates response data recording in a specific format information indicating the amount of sales per shift, and information indicating the number of employees working during each shift, on the date specified by the user.

The browser executor 601 of the management device 17 then receives the HTTP response the control server 15 sent.

Next, the browser executor 601, based on the response data contained in the received HTTP response, displays on the management device display 63 a sales vs attendance display screen G141 (FIG. 14) presenting at least information indicating the amount of sales per shift, and information indicating the number of employees working during each shift, on the date specified by the user.

Figure 14:
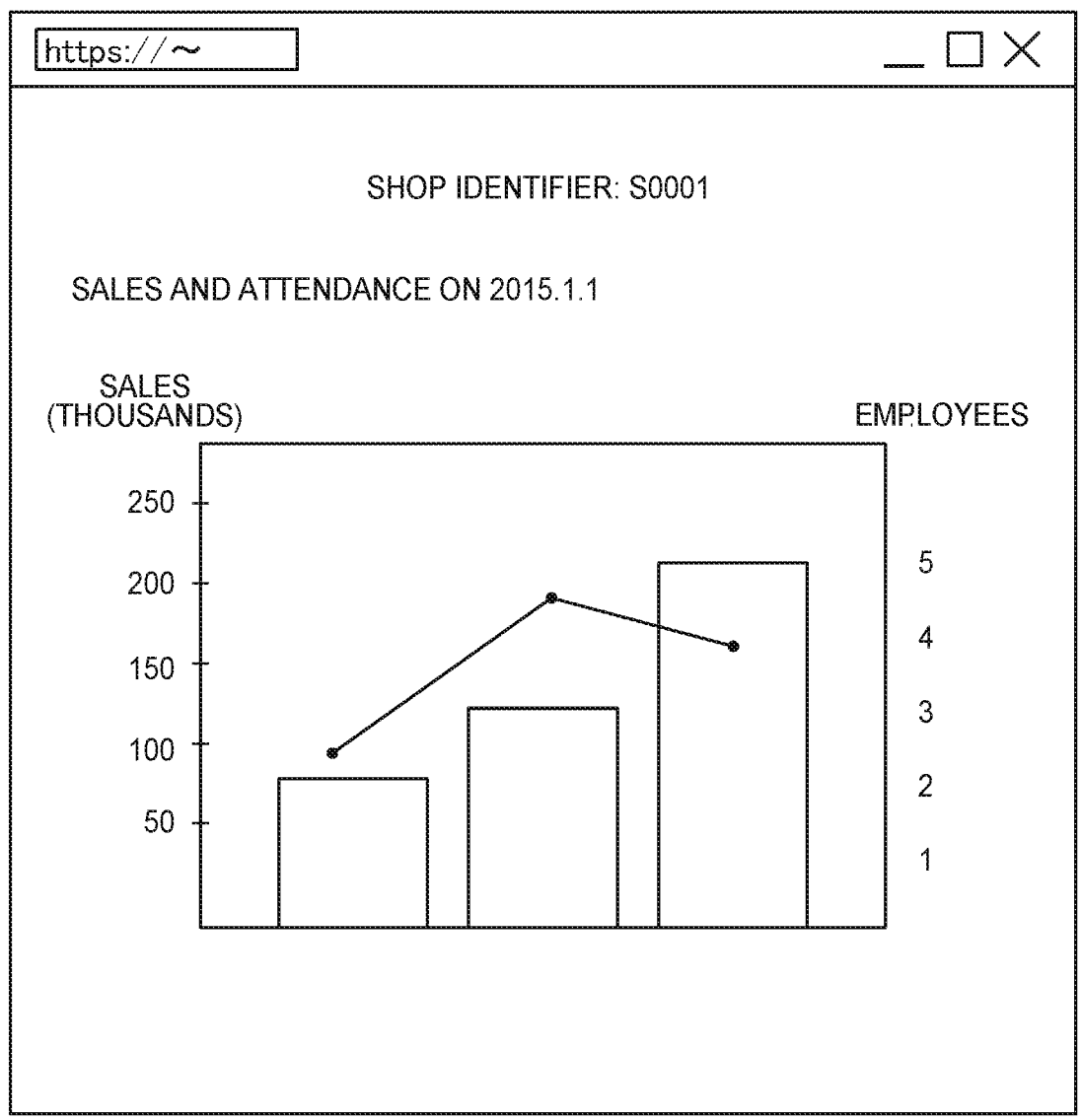
FIG. 14 shows an example of a sales vs attendance display screen.

FIG. 14 shows an example of a sales vs attendance display screen G141.

As shown in FIG. 14, the sales vs attendance display screen G141 presents information indicating the amount of sales per shift, and information indicating the number of employees working during each shift, on the date specified by the user. As illustrated in FIG. 14, the number of employees per shift is represented by the bar graph and the change in sales per shift is represented by the line graph.

In the example in FIG. 14, a graph is presented on the sales vs attendance display screen G141, and the change in sales per shift is shown by a line graph. The number of employees on each shift is also displayed in the same graph as the line representing sales so that the correlation between number of employees and sales is obvious.

This sales vs attendance display screen G141 is an example of a screen displaying transaction-related information and attendance information.

A third process whereby the control server 15 provides, for each specific time period (work shift) on a specific date specified by the user, information indicating store sales by time period, and information indicating the number of employees working in each time period. In this example, the information indicating store sales by time period (work shift) is an example of transaction-related information, and the information indicating the number of employees working in each time period (work shift) is an example of attendance-related information.

However, the transaction-related information is not limited to the foregoing example. Another example of transaction-related information is the number of receipts produced per time period (which equals the number of transactions completed in each time period).

The attendance-related information is also not limited to the foregoing. Another example of attendance-related information is the employee identifier of each employee that worked during each shift.

The time periods are also not limited to the foregoing. For example, the time periods may be defined by seconds, minutes, or month units.

As described above, the control server controller 40 (controller) of the control server 15 (information processing device) according to this embodiment, using an attendance manager database 422 storing attendance-related information based on attendance sheet production data (print data) instructing printing information related to attendance, runs processes based on the attendance manager database 422 in response to an instruction from a management device 17 (external device), and sends information indicating process results to the management device 17.

The management device 17 in this configuration can, by instructing the control server 15, acquire attendance-related information based on the attendance manager database 422, and execute processes based on the acquired information, including displaying or storing information based on the acquired information. Printed attendance-related information can thus be used through the management device 17.

Based on the attendance sheet production data, the attendance manager database 422 in this embodiment relationally stores employee identifiers J11 identifying individual employees, and attendance management information J17 related to employee attendance. When response request information including employee identifiers J11 and requesting information related to the attendance of employees is received from the management device 17, the control server controller 40 generates information related to employee attendance based on the employee identifier J11 contained in the response request information and the attendance management information J17 relationally stored in the attendance manager database 422, and sends the generated information to the management device 17.

Functions of the control server 15 in this configuration enable the management device 17 to acquire information related to the attendance of specific employees.

The response request information sent by the management device 17 in this embodiment includes API call information specifying an API stored on the control server 15. The control server controller 40 generates information related to employee attendance by the API specified by the API call information contained in the response request information.

This configuration enables the management device 17 to easily acquire information related to the attendance of a specific employee using an API on the control server 15.

The attendance manager database 422 in this embodiment stores information related to the attendance of one or more employees that work in a business. When response request information including a shop identifier J16 identifying a specific shop, and requesting information related to the attendance of employees working in the shop is received from the management device 17, the control server controller 40, using the attendance manager database 422, generates information related to the attendance of employees working in the shop identified by the shop identifier J16 contained in the response request information, and sends the generated information to the management device 17.

This configuration enables the management device 17 to acquire information related to the attendance of employees working in a specific store using a function of the control server 15.

The response request information sent by the management device 17 in this embodiment includes API call information specifying an API on the control server 15. The control server controller 40 generates information related to the attendance of employees working a specific store by the API specified by the API call information contained in the response request information.

This configuration enables the management device 17 to easily acquire information related to the attendance of employees working in a specific shop using an API on the control server 15.

Based on the attendance manager database 422 and receipt production command data instructing printing receipts, the control server controller 40 in this embodiment, using the transaction information manager database 421 storing information related to transactions printed on receipts, displays a screen (sales vs attendance display screen G141) presenting transaction-related information and attendance-related information on the management device 17 in response to a command from the management device 17.

A user reading the screen displayed on the management device 17 in this configuration can see the correlation between transaction-related information and attendance-related information.

Embodiment 2

A second embodiment is described below with reference to the figures. Note that like parts in this and the first embodiment are identified by like reference numerals, and redundant description is omitted below.

Figure 15:
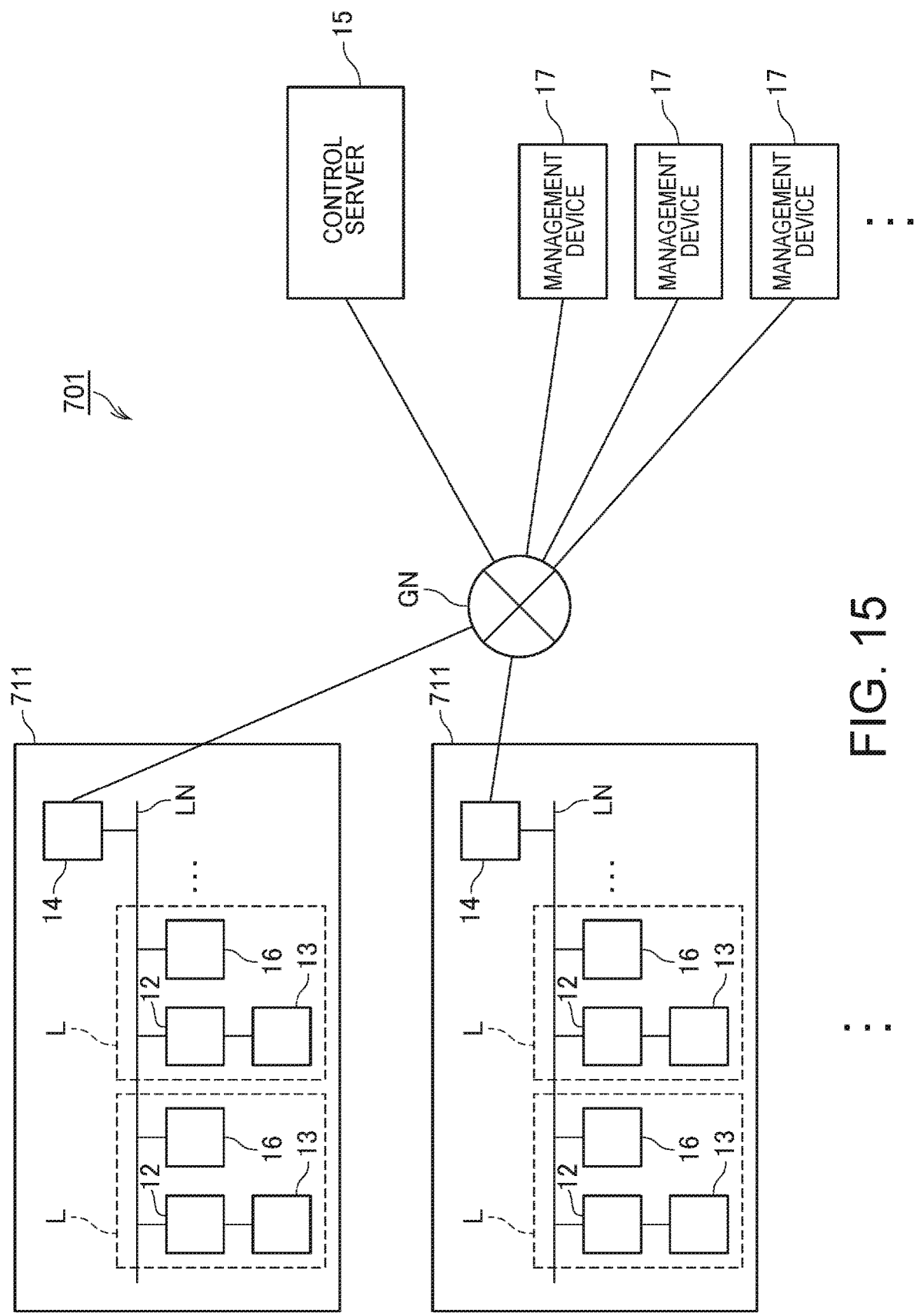
FIG. 15 illustrates the configuration of a transaction processing system according to a second embodiment of the invention.

FIG. 15 shows the configuration of a transaction processing system 701 (information processing system or network system) according to this embodiment of the invention.

As shown in FIG. 15, the transaction processing system 701 includes a plurality of store systems 711. Like the store system 11 in the first embodiment, a store system 711 in this embodiment is a system used in retail businesses. The store system 711 has functions for processing transactions according to the products purchased by customers, and producing receipts based on the transactions.

A checkout counter L where customer transactions are processed is located in the business where the store system 711 is deployed. A printer 12 is installed at the checkout counter L. A tablet terminal 13 (external device) and printer 12 are also disposed at the checkout counter L.

Figure 16:
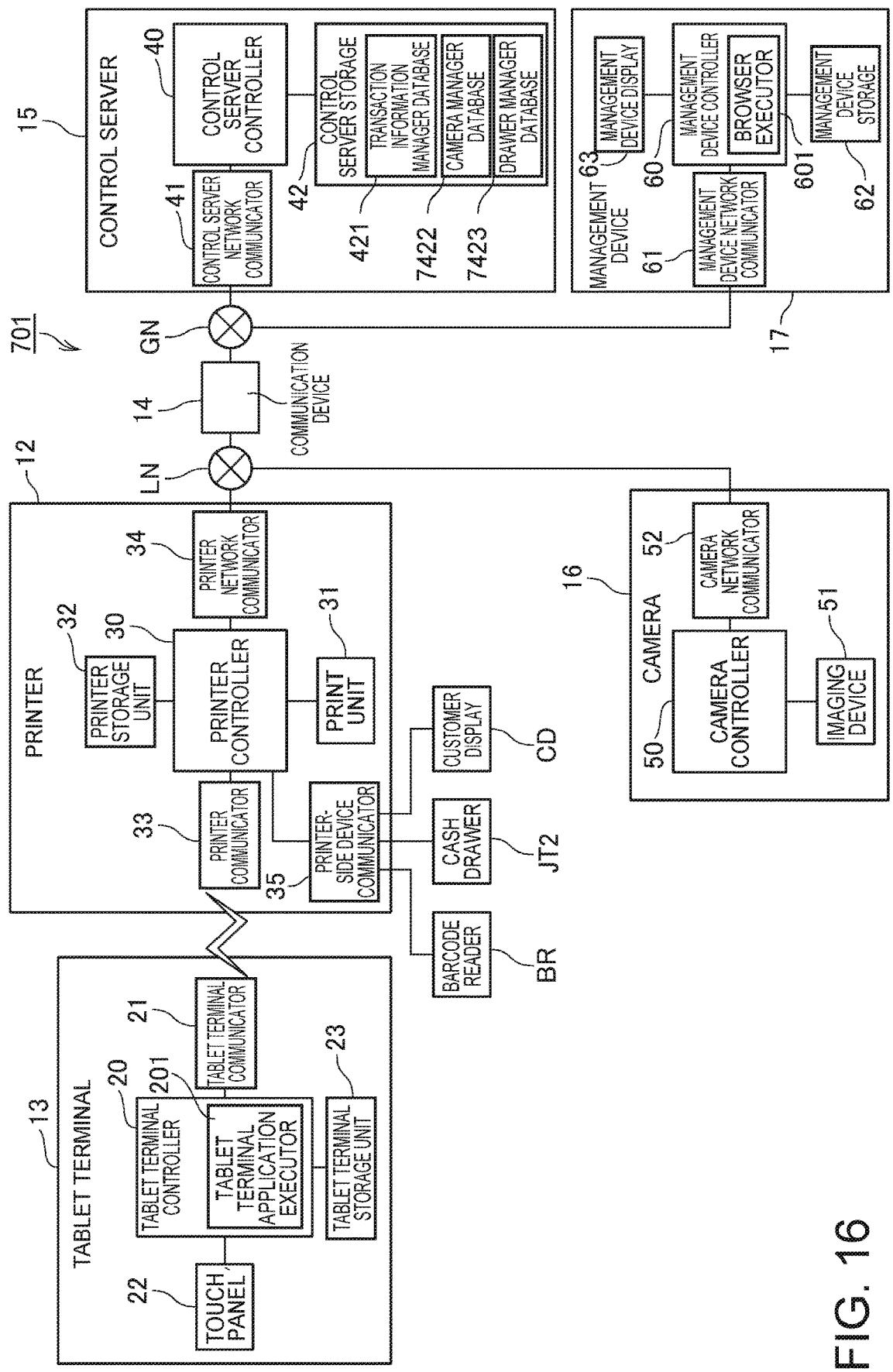
FIG. 16 is a block diagram illustrating the functional configuration of devices in the transaction processing system according to the second embodiment of the invention.

A barcode reader BR for reading barcodes, and a cash drawer JT2 are examples of devices connected to the printer 12 disposed at the checkout counter L in this example (see FIG. 16).

The cash drawer JT2 has a case and a tray can be stored inside the case. The tray has receptacles for holding cash, for example.

When the tray is pushed into the case of the cash drawer JT2, the tray is locked to the case by a lock mechanism so that the tray cannot be manually pulled out from the case. The cash drawer JT2 can also release the lock mechanism as controlled by the printer 12 so that the tray can be pulled out from the case. Once the tray is pulled out from the case, it is manually pushed back into the case by the checkout clerk. Below, the tray is said to be open when the tray is not locked to the case of the cash drawer JT2.

During a transaction at the checkout counter L, the cash register operator reads barcodes from the products or product packaging using a barcode reader BR connected to the printer 12, and inputs information related to the transaction to the tablet terminal 13.

The tablet terminal 13 controls the printer 12 at a specific time to open the cash drawer JT2. When the cash drawer JT2 opens, money can be removed from the cash drawer JT2, and money can be stored in the cash drawer JT2. The checkout clerk exchanges money with the customer using the open cash drawer JT2.

A camera 16 (processing device) is also disposed at the checkout counter L. The camera 16 is a device that can record video. The camera 16 is disposed at the checkout counter L to a position where it can image at least the tray when the cash drawer JT2 is open. Operation of the camera 16 is described further below.

A local area network LN is deployed in the store system 711. The printer 12 connects to the local area network LN using a communication protocol used on the LAN. A communication device 14 is also connected to the local area network LN. Note that in FIG. 15 the communication device 14 is represented by a single block, but the communication device 14 may comprise multiple devices with specific functions. The printer 12 and camera 16 can also access the global network GN through the communication device 14.

A control server 15 (server) is connected to the global network GN. The control server 15 is a server of which the printers 12, cameras 16, and management devices 17 are clients. The control server 15 executes processes as required, and sends data based on the results of those processes to the client. Note that the control server 15 is represented by a single block in FIG. 15, but this does not mean that the control server 15 is embodied by a single server device. For example, the control server 15 may comprise a plurality of server devices. More specifically, the control server 15 may be configured in any way enabling executing the processes described below.

A management device 17 is also connected to the global network GN.

FIG. 16 is a block diagram illustrating the functional configuration of devices in the transaction processing system 701 according to this embodiment of the invention.

The configuration, function, and processes based on the functions of the printer 12, tablet terminal 13, control server 15, and management device 17 are as described in the first embodiment above, and differences from the first embodiment are described below.

A barcode reader BR, customer display CD, and cash drawer JT2 are examples of devices connected to the printer 12 in this example.

As described above, the cash drawer JT2 has a case and a tray that can be housed inside the case. The tray has compartments for holding money.

The camera 16 comprises a camera controller 50, imaging device 51, and camera network communicator 52.

The camera controller 50 includes a CPU, ROM, RAM, and other peripheral circuits, and controls the camera 16. The CPU controls parts of the camera 16 by reading and running firmware stored in ROM or other storage.

The imaging device 51 comprises an imaging element such as a CCD image sensor or CMOS image sensor, lens group, and lens driver that drives the lens group to adjust the zoom and focus, for example, and captures images as controlled by the camera controller 50. Based on input from the imaging element of the imaging device 51, the camera controller 50 generates image data in a specific still image file format. Based on the image data generated from the input from the imaging element during a specific period of time, the camera controller 50 also generates image data comprising multiple still images in a specific video file format.

The camera network communicator 52 communicates as controlled by the camera controller 50 according to a specific communication protocol with devices (including the control server 15) connected to the global network GN and devices connected to the local area network LN.

The control server 15 is a cloud server to which the printer 12 and management device 17 connect as clients.

As shown in FIG. 16, the control server 15 includes a control server controller 40 (controller), control server network communicator 41, and control server storage 42 (storage). The basic configuration is the same as described in the first embodiment, but the data stored by the control server storage 42 differs.

The control server storage 42 comprises nonvolatile memory, and stores data (including the transaction information manager database 421, attendance manager database 422, and a drawer manager database 7423).

The control server network communicator 41 communicates with devices connected to the global network GN (including printers 12, cameras 16, and management devices 17) according to a specific communication protocol as controlled by the control server controller 40.

Operation of the tablet terminal 13, printer 12, and control server 15 when a customer transaction is processed at the checkout counter L is described next.

In this example the printer 12 runs at least a process of producing a receipt as controlled by the tablet terminal 13, and a process controlling the cash drawer JT2, according to the transaction performed at the checkout counter L.

The processes run by devices according to the transaction at the checkout counter L are described in two instances: when the printer 12 produces a receipt, and when the printer 12 controls the cash drawer JT2.

The process whereby the printer 12 produces a receipt is the same as the process described above with reference to FIG. 3 to FIG. 5 in the first embodiment. Transaction information is therefore stored in the transaction information manager database 421 for each transaction completed in the store. As a result, the control server 15 can, in response to a query from an external device, provide useful information related to transactions based on the transaction information stored in the transaction information manager database 421.

Processes executed by devices when the printer 12 controls the cash drawer JT2 according to a transaction performed at the checkout counter L are described next.

Figure 17:
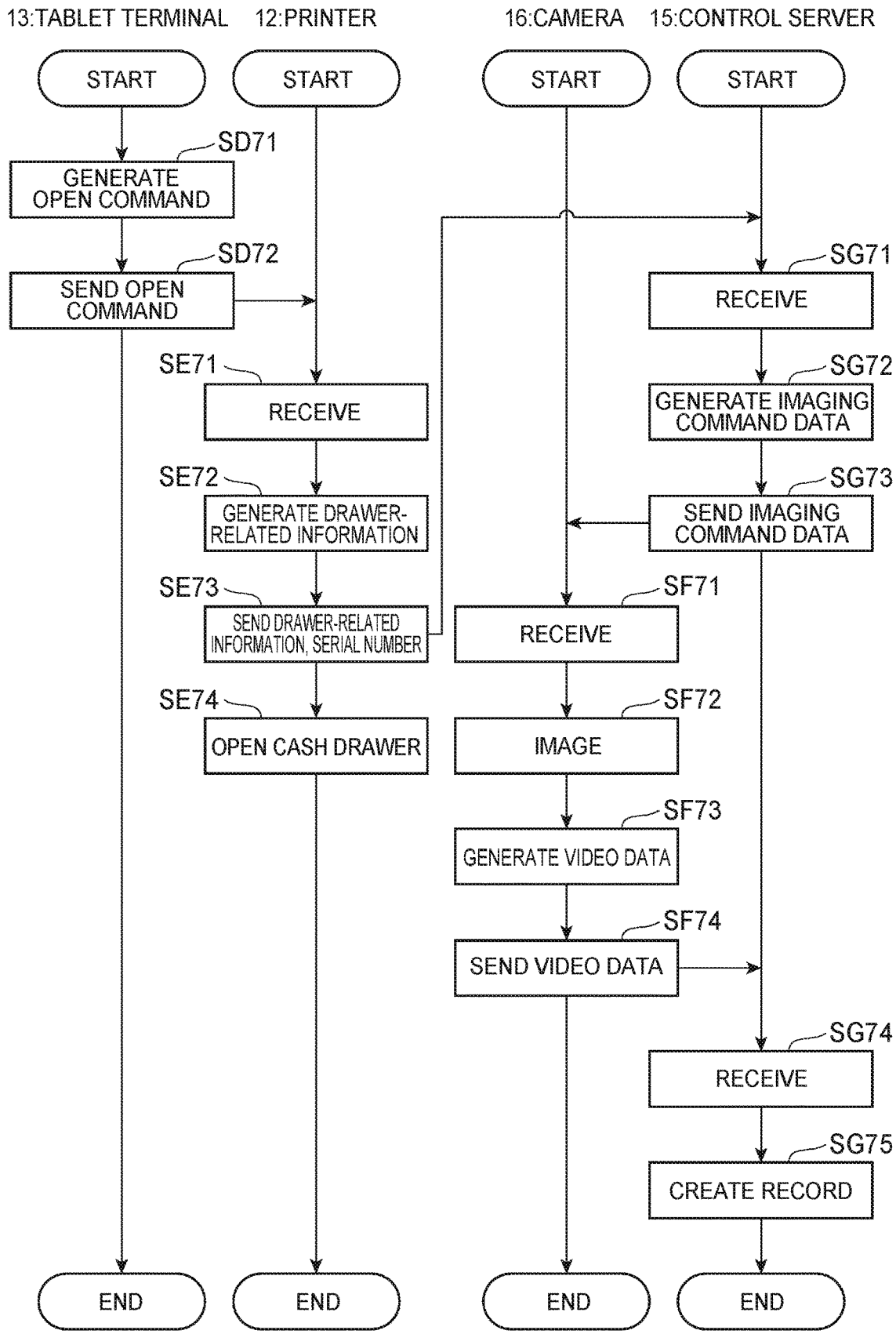
FIG. 17 is a flow chart of the operation of the tablet terminal, printer, camera, and control server.

FIG. 17 is a flow chart showing the operation of the tablet terminal 13, printer 12, camera 16, and control server 15 when the printer 12 controls the cash drawer JT2 according to a transaction performed at the checkout counter L.

As shown in FIG. 17, the tablet terminal application executor 201 of the tablet terminal controller 20 of the tablet terminal 13 executes the transaction process (payment process) according to the customer transaction, and generates an open command (control command) at a specific time (step SD71). The open command is a control command instructing the cash drawer JT2 to open. In this example the tablet terminal application executor 201 generates the open command when the checkout counter L inputs a calculate subtotal command to the touch panel 22. Next, the tablet terminal application executor 201 controls the tablet terminal communicator 21 to send the generated open command to the printer 12 (step SD72).

As shown in FIG. 17, the printer controller 30 of the printer 12 controls the printer communicator 33 to receive the open command (step SE71).

Next, the printer controller 30, based on the open command received in step SE71, generates drawer-related information J711 (step SE72).

The drawer-related information J711 includes open command receipt report indicating that an open command was received. The drawer-related information J711 also includes an open command time stamp indicating when (date and time) the open command was received.

After generating the drawer-related information J711, the printer controller 30 controls the printer network communicator 34 to send the drawer-related information J711 generated in step SE72 and serial number J9 to the control server 15 (step SE73).

Note that the communication information (information related to the destination, the protocol used for communication, and the format of the transmitted data, for example) required to transmit the drawer-related information J711 and serial number J9 in step SE73 is previously registered in the printer 12.

Next, the printer controller 30 controls and opens the cash drawer JT2 based on the open command received in step SE71 (step SE74). In step SE74, the printer controller 30 communicates with the cash drawer JT2 to unlock the tray from the case of the cash drawer JT2, kicks the tray out from the case, and opens the cash drawer JT2.

As shown in FIG. 17, the control server controller 40 of the control server 15 controls the control server network communicator 41 to receive the serial number J9 and drawer-related information J711 the printer 12 sent (step SG71).

Next, the control server controller 40 generates imaging command data (step SG72). Imaging command data is control data instructing the camera 16 to capture images for a specific time. The imaging command data comprises one or more control commands in the command language of the camera 16.

Next, the control server controller 40 controls the control server network communicator 41 to send the imaging command data generated in step SG72 to the camera 16 (step SG73).

The camera 16 to which the control server controller 40 sends the imaging command data in step SG73 is a camera 16 installed at the same checkout counter L as the checkout counter L where the printer 12 that sent the drawer-related information J711 is located. In other words, the camera 16 to which the control server controller 40 sends the imaging command data in step SG73 is the camera 16 that images the cash drawer JT2 connected to the printer 12 that sent the drawer-related information J711.

A camera manager database 7422 is stored in the control server storage 42. The camera manager database 7422 relationally stores, for each camera 16 in the store, the shop identifier identifying the shop where the camera 16 is located, the serial number J9 of the printer 12 connected to the cash drawer JT2 that the camera 16 images, and communication information required to transmit the imaging command data and other data to the camera 16 (such as the address of the camera 16, communication protocol, and the format of the transmitted data).

In step SG73, the control server controller 40 finds the matching record in the camera manager database 7422 based on the serial number J9 received in step SG71, and based on the found record sends the imaging command data to the corresponding camera 16.

As shown in FIG. 17, the camera controller 50 of the camera 16 controls the camera network communicator 52 to receive the imaging command data (step SF71).

Next, the camera controller 50, based on the imaging command data received in step SF71, controls the imaging device 51 to capture images for a specific time (step SF72). The timing when the camera 16 starts imaging in step SF72 is close to the timing when the cash drawer JT2 opens in step SE74. Communication between the printer 12, camera 16, and control server 15 may be adjusted so that these times are reliably close.

In step SF72, the cash drawer JT2 is imaged by the camera 16 for a specific period of time corresponding to the cash drawer JT2 opening. As a result, the camera 16 captures images of the checkout clerk taking money from the cash drawer JT2 and putting money into the cash drawer JT2 during the transaction.

Based on imaging by the imaging device 51 for the specific time, the camera controller 50 generates video data (referred to below as drawer video data J714) related to imaging for the specific time (step SF73). This specific time is for a previously set imaging time or until the cash drawer JT2 is closed.

Next, the camera controller 50 controls the camera network communicator 52 to send the drawer video data J714 generated in step SF73 to the control server 15 (step SF74).

As shown in FIG. 17, the control server controller 40 of the control server 15 controls the control server network communicator 41 to receive the drawer video data J714 (step SG74).

Next, the control server controller 40, based on the drawer-related information J711 and serial number J9 received in step SG71, and the drawer video data J714 received in step SG74, generates one record in the drawer manager database 7423 (step SG75).

FIG. 18 illustrates the information (data) stored in a each record of the drawer manager database 7423.

As shown in FIG. 18, one record in the drawer manager database 7423 contains a record identifier J712, batch identifier J10, serial number J9, drawer-related information J711, and drawer video data J714.

The record identifier J712 is information identifying a particular record in the drawer manager database 7423.

In step SG75, the control server controller 40 generates a record identifier J712 with a unique value. The control server controller 40 also generates a batch identifier J10. The value of the batch identifier J10 generated by the control server controller 40 is the same value as the batch identifier J10 contained in the record created in the transaction information manager database 421 for the corresponding transaction. In other words, the value of the batch identifier J10 in the record created in the drawer manager database 7423 when the cash drawer JT2 is opened in one transaction, and the value of the batch identifier J10 in the record created in the transaction information manager database 421 for the same transaction, are the same.

The control server controller 40 creates in the drawer manager database 7423 one record containing the generated record identifier J712, the generated batch identifier J10, the serial number J9, drawer-related information J711, and drawer video data J714.

As described above, the control server 15 creates a record in the drawer manager database 7423 in response the cash drawer JT2 opening.

A process the control server 15 runs using the drawer manager database 7423 is described next.

Multiple Web API s (Application Programming Interfaces) are stored on the control server 15. In response to access from the management device 17, the control server 15 can execute processes through the registered Web APIs and provide required information to users based on the drawer manager database 7423.

Processes (a fourth process and fifth process) executed by the control server 15 to provide information are described using two examples below.

Fourth Process

The user may want to get information indicating when the cash drawer JT2 connected to a specific printer 12 was open during a specific period of time. This is because by acquiring this information, operation of the cash drawer JT2 can be accurately determined. Because the timing when the cash drawer JT2 opens is during a transaction, by acquiring this information, the number of transactions performed at the corresponding checkout counter L during a specific time, and the frequency of transactions, can be accurately determined.

In this example, when accessed from the management device 17, the control server 15 provides information related to when the cash drawer JT2 connected to the printer 12 specified by the user was open during a specific period of time specified by the user using the method described below.

The following example describes operation when the management device 17 accesses the control server 15, but the device used to access the control server 15 is not limited to the management device 17. The device accessing the control server 15 may be any authorized device on which a browser is installed. This also applies to the fifth process described below.

Figure 19:
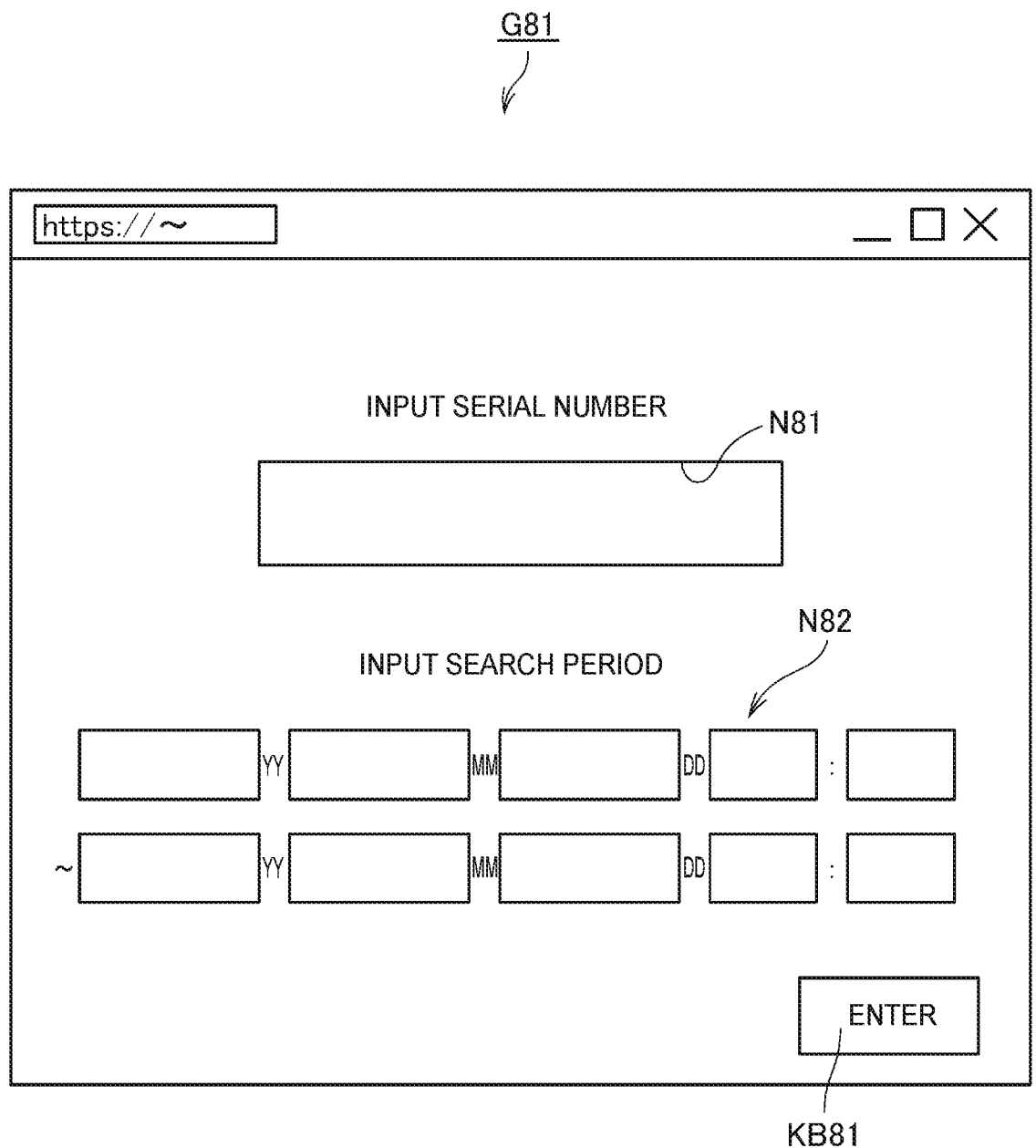
FIG. 19 shows an example of a cash drawer information input screen.

The user starts the browser on the management device 17, and accesses a specific URL on the control server 15 to display a cash drawer information input screen G81 (FIG. 19). The user is previously informed of this URL by a specific method.

The browser executor 601 of the management device controller 60 of the management device 17 accesses the specific URL on the control server 15 in response to the user command. In response to the specific URL being accessed, the control server controller 40 of the control server 15 sends an HTML file for displaying the cash drawer information input screen G81 (FIG. 19) to the management device 17.

The browser executor 601 of the management device 17 then presents the cash drawer information input screen G81 (FIG. 19) based on the received HTML file on the management device display 63.

Note that while not described in detail below, when the control server 15 is accessed from the management device 17, authentication determining if the user is a person with the specific authority is performed appropriately by a specific method.

FIG. 19 shows an example of a cash drawer information input screen G81.

As shown in FIG. 19, the cash drawer information input screen G81 has a serial number input field N81. The serial number input field N81 is a field for inputting the serial number J9. The user inputs the serial number J9 of the printer 12 connected to the cash drawer JT2 for which information is desired to the serial number input field N81.

As shown in FIG. 19, the cash drawer information input screen G81 also has a time period input field N82. The time period input field N82 is an input field for inputting the time period. The user inputs information indicating the time period to the time period input field N82.

The information indicating the time period input to the time period input field N82 is referred to below as the drawer-related period information.

As shown in FIG. 19, the cash drawer information input screen G81 also has an Enter button KB81. The Enter button KB81 is a button for confirming input to the cash drawer information input screen G81. The user operates the Enter button KB81 to confirm input to the cash drawer information input screen G81.

When operation of the Enter button KB81 in the cash drawer information input screen G81 is detected, the browser executor 601 of the management device 17 acquires the information input to the input fields of the cash drawer information input screen G81.

Next, the browser executor 601, based on the acquired information, generates an HTTP request, and sends the generated HTTP request to the control server 15. The browser executor 601 generates and sends the HTTP request by a function of a script embedded in the HTML file related to the cash drawer information input screen G81, for example.

The GET method is used on the request line of the HTTP request. The specific URL to access on the control server 15 is recorded as the pathname, and information specifying the specific corresponding Web API (referred to below as the fourth Web API) is recorded according to a rule, on the request line of the HTTP request. The serial number J9 and drawer-related period information that are passed as parameters to the fourth Web API are also recorded according to a specific rule as a query parameter in the pathname.

Note that an HTTP request is an example of response request information requesting a response related to the cash drawer JT2, and including the printer identifier.

The control server controller 40 of the control server 15 receives the HTTP request of the fourth Web API that the management device 17 sent.

Next, the control server controller 40 executes the following process based on the fourth Web API specified by the received HTTP request, and the query parameters (serial number J9, drawer-related period information.

More specifically, by a function of the fourth Web API, the control server controller 40 retrieves the information matching the HTTP request from the drawer manager database 7423, generates data ("response data" below) recording the retrieved information in JSON (JavaScript® Object Notation) format, and returns the generated response data in an HTTP response.

Note that the HTTP response and the response data contained in the HTTP response are examples of information indicating the process result.

Describing generating the response data more specifically, the control server controller 40 executes the following process through functions of the fourth Web API. Specifically, the control server controller 40 finds in the records of the drawer manager database 7423 the record storing the same serial number J9 as the serial number J9 contained in the query parameter. Next, the control server controller 40 gets the drawer-related information J711 from the found record. Next, the control server controller 40, based on the drawer-related information J711, acquires the information indicating when the cash drawer JT2 was opened (which is when the printer 12 received the open command) during the period indicated by the drawer-related period information in the query parameter. Because the open command time stamp is contained in the drawer-related information J711, the control server controller 40 can acquire, based on the drawer-related information J711, information indicating when the cash drawer JT2 was opened during the period specified by the drawer-related period information.

Next, the control server controller 40 generates response data recording the acquired information indicating in a specific format when the cash drawer JT2 was open.

The browser executor 601 of the management device 17 then receives the HTTP response the control server 15 sent.

Next, the browser executor 601, based on the response data contained in the received HTTP response, displays on the management device display 63 a cash drawer information display screen G791 containing at least the information indicating when the cash drawer JT2 was open in the period specified by the user.

Figure 20:
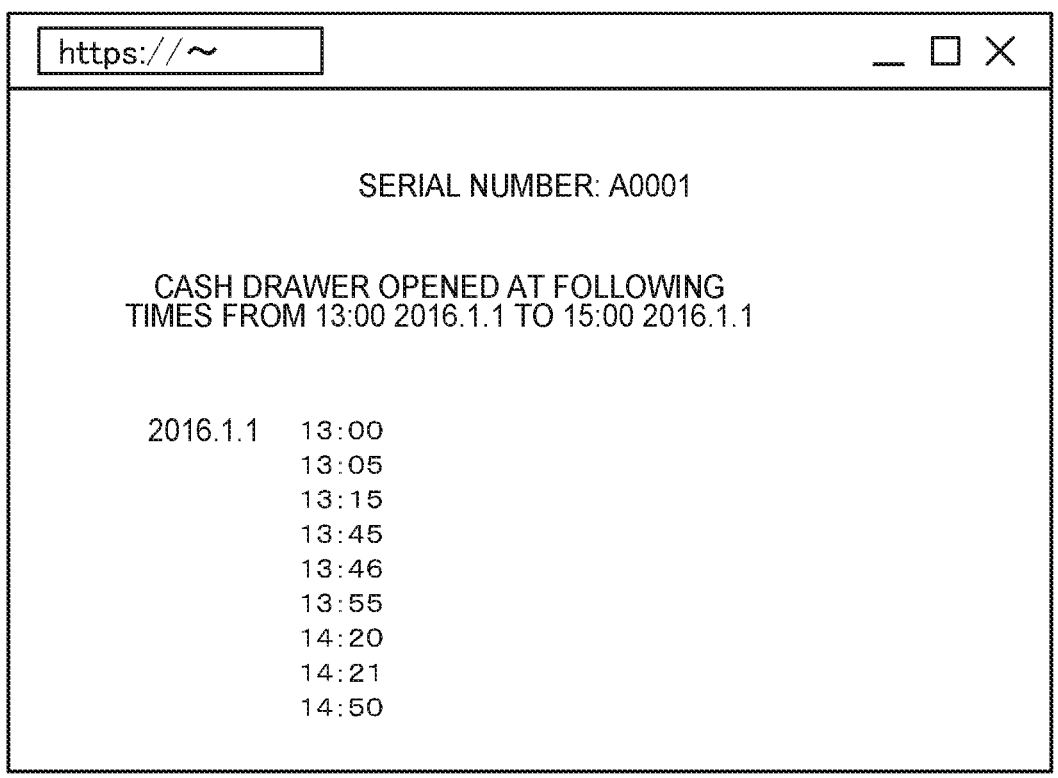
FIG. 20 shows an example of a cash drawer information display screen.

FIG. 20 shows an example of a cash drawer information display screen G791.

As shown in FIG. 20, information indicating when the cash drawer JT2 was open in the period specified by the user is displayed in the cash drawer information display screen G791.

By reading the cash drawer information display screen G791, the user can reliably acquire information indicating when the cash drawer JT2 was open in the period specified by the user.

Fifth Process

A user may also want to view video based on the drawer video data J714 gated from the images captured by the camera 16 for a specific transaction. For example, if the checkout clerk makes a mistake when receiving money from the customer or making change for the customer in a specific transaction, the user may want to view the video based on the images of the camera 16 for that specific transaction to check if money was received and change was made correctly.

In this example, when accessed from the management device 17, the control server 15 provides to the user using the method described below video based on the images from the camera 16 for the transaction specified by the user.

Figure 21:
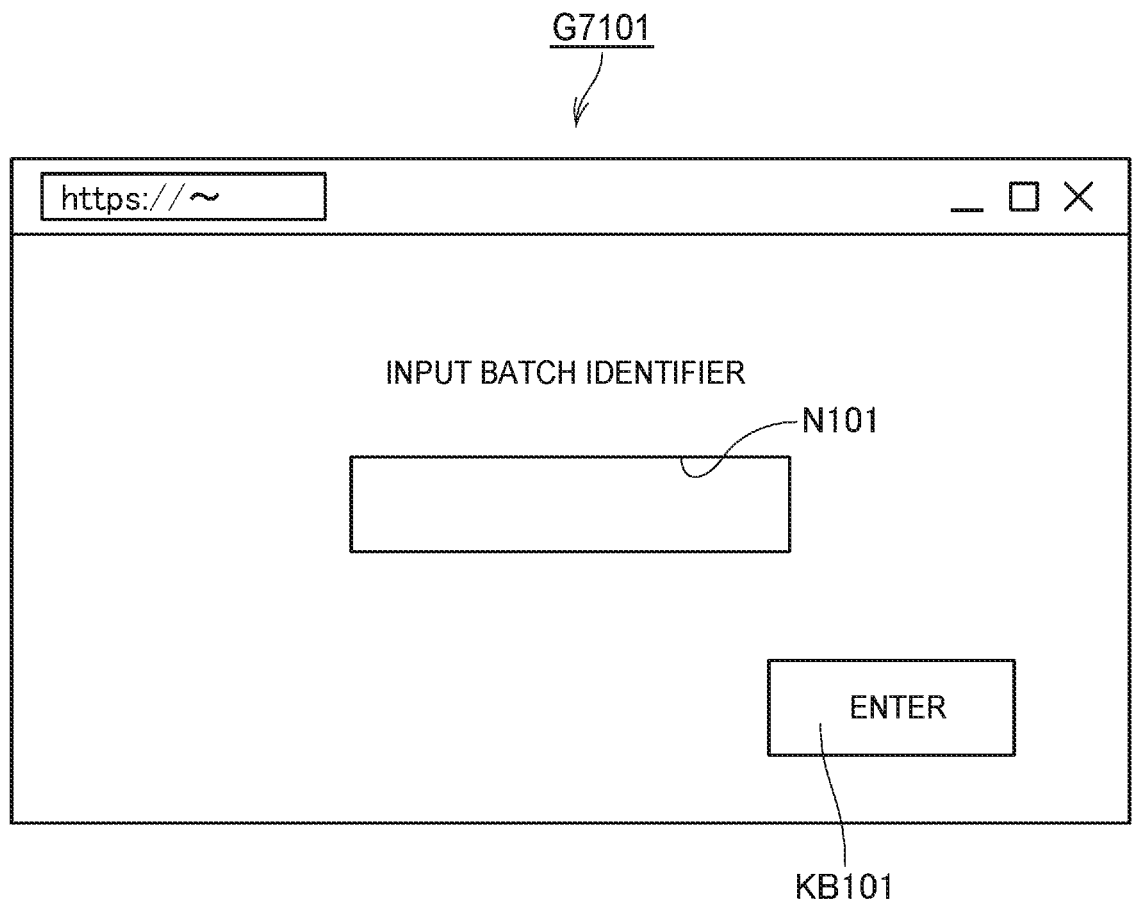
FIG. 21 shows an example of a batch identifier input screen.

The user starts the browser on the management device 17, and accesses a specific URL on the control server 15 to display the batch identifier input screen G7101 (FIG. 21). The user is previously informed of this URL by a specific method.

The browser executor 601 of the management device controller 60 of the management device 17 accesses the specific URL on the control server 15 in response to the user command. In response to the specific URL being accessed, the control server controller 40 of the control server 15 sends an HTML file for displaying the batch identifier input screen G7101 (FIG. 21) to the management device 17.

The browser executor 601 of the management device 17 then presents the batch identifier input screen G7101 (FIG. 21) based on the received HTML file on the management device display 63.

FIG. 21 shows an example of the batch identifier input screen G7101.

As shown in FIG. 11, the batch identifier input screen G7101 has a batch identifier input field N101. The batch identifier input field N101 is an input field for inputting the shop identifier J16. The user inputs to the shop identifier input field N111 the shop identifier J16 of the specific store (shop) for which the attendance-related information is desired.

As shown in FIG. 21, batch identifier input screen G7101 has a batch identifier input field N101. The batch identifier input field N101 is an input field for inputting the batch identifier J10. The user inputs by a specific means the value of the batch identifier J10 for a specific transaction.

As shown in FIG. 21, batch identifier input screen G7101 has an Enter button KB101. The Enter button KB101 is a button for confirming input to the batch identifier input screen G7101. The user operates the Enter button KB101 to confirm input to the batch identifier input screen G7101.

When operation of the Enter button KB101 in the batch identifier input screen G7101 is detected, the browser executor 601 of the management device 17 acquires the information input to the input fields of the batch identifier input screen G7101.

Next, the browser executor 601, based on the acquired information, generates an HTTP request, and sends the generated HTTP request to the control server 15. The browser executor 601 generates and sends the HTTP request by a function of a script embedded in the HTML file related to the batch identifier input screen G7101, for example.

The GET method is used on the request line of the HTTP request. The specific URL to access on the control server 15 is recorded as the pathname, and information specifying the specific corresponding Web API (referred to below as the fifth Web API) is recorded according to a rule, on the request line of the HTTP request. The batch identifier J10 that is passed as a parameter to the fifth Web API are also recorded according to a specific rule as a query parameter in the pathname.

The control server controller 40 of the control server 15 receives the HTTP request of the fifth Web API that the management device 17 sent.

Next, the control server controller 40 executes the following process based on the fifth Web API specified by the received HTTP request, and the query parameter (batch identifier J10).

More specifically, by a function of the fifth Web API, the control server controller 40 retrieves the information matching the HTTP request from the drawer manager database 7423, generates data ("response data" below) recording the retrieved information in JSON format, and returns the generated response data in an HTTP response.

Note that the HTTP response and the response data contained in the HTTP response are examples of information indicating the process result.

Describing generating the response data more specifically, the control server controller 40 executes the following process through functions of the fifth Web API. Specifically, the control server controller 40 finds in the records of the drawer manager database 7423 the one or multiple records storing the same batch identifier J10 as the batch identifier J10 contained in the query parameter.

Next, the control server controller 40 acquires the drawer video data J714 from the found one or multiple records. Next, the control server controller 40 generates response data recording the acquired drawer video data J714 in a specific format.

The browser executor 601 of the management device 17 then receives the HTTP response the control server 15 sent.

Next, the browser executor 601, based on the drawer video data J714 contained in the response data in the received HTTP response, displays the video in a specific web page. Note that a program with the ability to display video based on the drawer video data J714 is previously installed on the management device 17. The video presented in this specific web page is video based on the images captured by the camera 16 when the cash drawer JT2 was open during the specific transaction specified by the user.

By viewing the video displayed in the specific web page, the user can check, for example, if the checkout clerk made a mistake when receiving money from the customer or making change for the customer in the specific transaction.

As described above, the transaction processing system 701 (information processing system or network system) according to this embodiment includes printers 12 to which a cash drawer JT2 and tablet terminal 13 (external device) can connect, and a control server 15 (server) that can communicate through a network with the printers 12. When a printer 12 receives an open command (control command) from the tablet terminal 13 instructing opening the cash drawer JT2, the printer 12 sends to the control server 15 drawer-related information J711 including at least information open command receipt report information) indicating that an open command was received. When drawer-related information J711 is received, the control server 15 runs a process based on the received drawer-related information J711.

When the printer 12 in this configuration controls the cash drawer JT2 as controlled by the tablet terminal 13, the control server 15 can receive drawer-related information J711 from the printer 12, and can, based on the received drawer-related information J711, for example, execute processes such as managing and providing useful information related to the cash drawer JT2.

When drawer-related information J711 is received in this example, the control server 15 relationally stores the received drawer-related information J711 with the serial number J9 (printer identification information) identifying the printer 12 that sent the drawer-related information J711. When an HTTP request, which is an example of response request information including a serial number J9 and requesting information related to a cash drawer JT2, is received, the control server 15, based on the drawer-related information J711 related to the serial number J9, returns information related to the cash drawer JT2.

Thus comprised, the control server 15 can provide in response to a request information related to the cash drawer JT2 connected to a specific printer 12.

The drawer-related information J711 in this example includes information (open command time stamp) indicating when the open command was received. When this response request information is received, the control server 15, based on the drawer-related information J711 related to the printer identifier contained in the response request information, can return information indicating when the cash drawer JT2 was open during the specified period.

Based on the drawer-related information J711 received from a printer 12, the control server 15 can therefore provide useful information indicating when the cash drawer JT2 was open during a specified period of time.

When the control server 15 is connected to a camera 16 (processing device) through a network, and receives the drawer-related information J711, the control server 15 controls the camera 16 based on the received drawer-related information J711.

Thus comprised, the control server 15 can cause a specific processing device to run a specific process synchronized to the timing when the cash drawer JT2 connected to the printer 12 opens.

Note that in this embodiment the device connected as a processing device to the control server 15 is a camera 16, but the processing device connected to the control server 15 is not limited to a camera 16. For example, the processing device may be an audio output device that can output audio and is disposed at the checkout counter L. In this case, the control server 15 can control the audio output device to warn the checkout counter L by outputting specific audio when the cash drawer JT2 opens. In other words, the processing device may be any device that can provide a particular effect by executing a specific process at a timing corresponding to when the cash drawer JT2 opens.

A camera 16 that can image the cash drawer JT2 is connected to the control server 15 in this embodiment. When drawer-related information J711 is received, the control server 15 causes the camera 16 to start imaging.

The control server 15 in this embodiment can therefore control the camera 16 to image the cash drawer JT2 when the cash drawer JT2 is open and money can be removed from the cash drawer JT2 or placed into the cash drawer JT2.

Embodiment 3

A third embodiment of the invention is described below with reference to the figures. Note that like parts in this and the first embodiment are identified by like reference numerals, and redundant description is omitted below.

Figure 22:
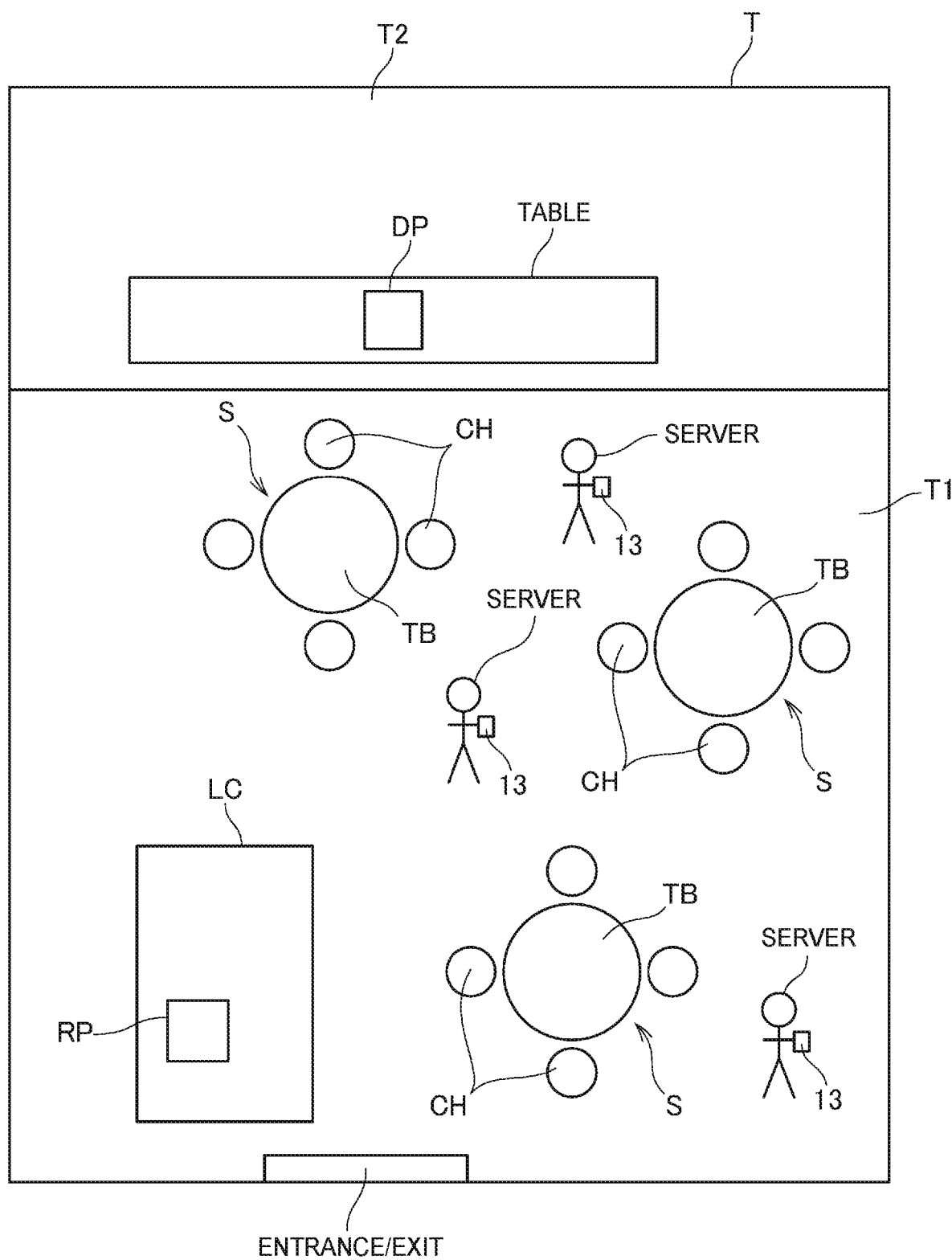
FIG. 22 illustrates use of the receipt printer and ticket printer in a third embodiment of the invention.

FIG. 22 illustrates how a receipt printer RP and a ticket printer DP according to this embodiment may be used.

FIG. 22 shows an example of where a receipt printer RP and a ticket printer DP may be used in a restaurant T (store) that provides food and drink to customers.

The restaurant T shown in FIG. 22 is divided into a dining room T1 and a kitchen T2.

The dining room T1 is where customers of the restaurant T sit and where the wait staff (referred to below as waiters) in the dining room T1 serve food and drink to the customers. There are multiple seatings S for use by customers in the dining room T1. Each seating S has a table TB on which food and drink may be placed, and one or more chairs CH for customers to sit.

A tablet terminal 13 that is used to take customer orders is previously assigned to each waiter. To receive a customer order in the dining room T1, a waiter goes to the customer, hears the order from the customer, and inputs the order to the tablet terminal 13.

A checkout counter LC where customers pay for their bill is located near the exit from the dining room T1. A receipt printer RP capable of printing is installed at the checkout counter LC. To process a payment at the checkout counter LC, the waiter goes to the checkout counter LC and inputs to the tablet terminal 13 information corresponding to the transaction. Once transaction information is input to the tablet terminal 13, the receipt printer RP produces a receipt on which is printed, in addition to a seating identifier, information related to the menu items ordered by the customer, subtotal information, tax information, and total amount information. The receipt is then given by the waiter to the customer.

The configuration, function, and processes based on the functions, of the receipt printer RP are described further below.

The kitchen T2 is the area where the ordered items are prepared by workers in the kitchen T2 ("kitchen staff" below), and has a drink machine, stove, refrigerator, and other appliances.

A ticket printer DP (printing device) with the ability to print is located in the kitchen T2.

When a waiter takes and inputs a customer order to the tablet terminal 13, the ticket printer DP prints an order ticket on which is printed the seating identifier and information identifying the menu items ordered by the customer (information indicating the content of the customer order). The information identifying the menu items includes, for example, the names of the ordered items and the quantity ordered. The kitchen staff then prepare the ordered items by referring to the order ticket printed by the ticket printer DP.

The configuration, function, and processes based on the functions, of the ticket printer DP are described further below.

Unless differentiating therebetween, the receipt printer RP and ticket printer DP are referred to as printer P below.

Figure 23:
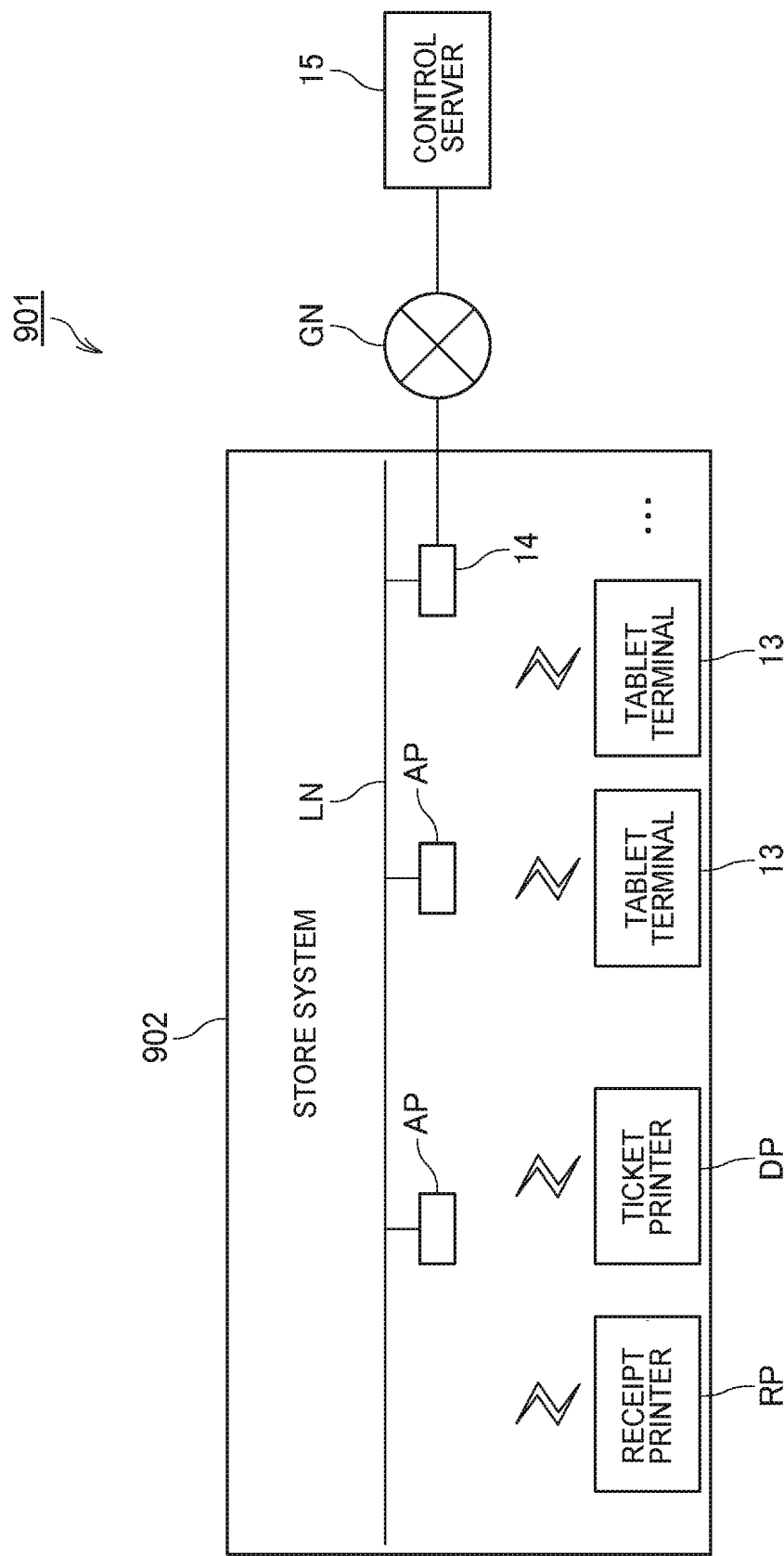
FIG. 23 illustrates the network system in the third embodiment of the invention.

FIG. 23 illustrates a network system 901 according to this embodiment.

As shown in FIG. 23, the network system 901 includes a store system 902 deployed in the restaurant T. The store system 902 has a local area network LN with an access point AP having a router function.

The tablet terminal 13, receipt printer RP, and ticket printer DP can each communicate wirelessly, accesses the local area network LN by communicating wirelessly with the access point AP, and can communicate with each other through the local area network LN.

A communication device 14 is connected to the local area network LN. The communication device 14 is an interface device that connects to the local area network LN and a global network GN such as the Internet. Note that in FIG. 23 the communication device 14 is represented by a single block, but the communication device 14 may comprise multiple devices with specific functions.

The printers P can control the communication device 14 and access the global network GN.

Note also that in FIG. 23 the network system 901 is shown with one store system 902, but the network system 901 may comprise multiple store systems 902. In this configuration, a store system 902 is deployed in each of plural stores, and each store system 902 connects to the global network GN.

A control server 15 in the network system 901 is connected to the global network GN. The control server 15 is a server of which the printers P are clients.

Note that the control server 15 is represented by a single block in FIG. 23, but this does not mean that the control server 15 is embodied by a single server device. For example, the control server 15 may comprise a plurality of server devices. More specifically, the control server 15 may be configured in any way enabling executing the processes described below.

Figure 24:
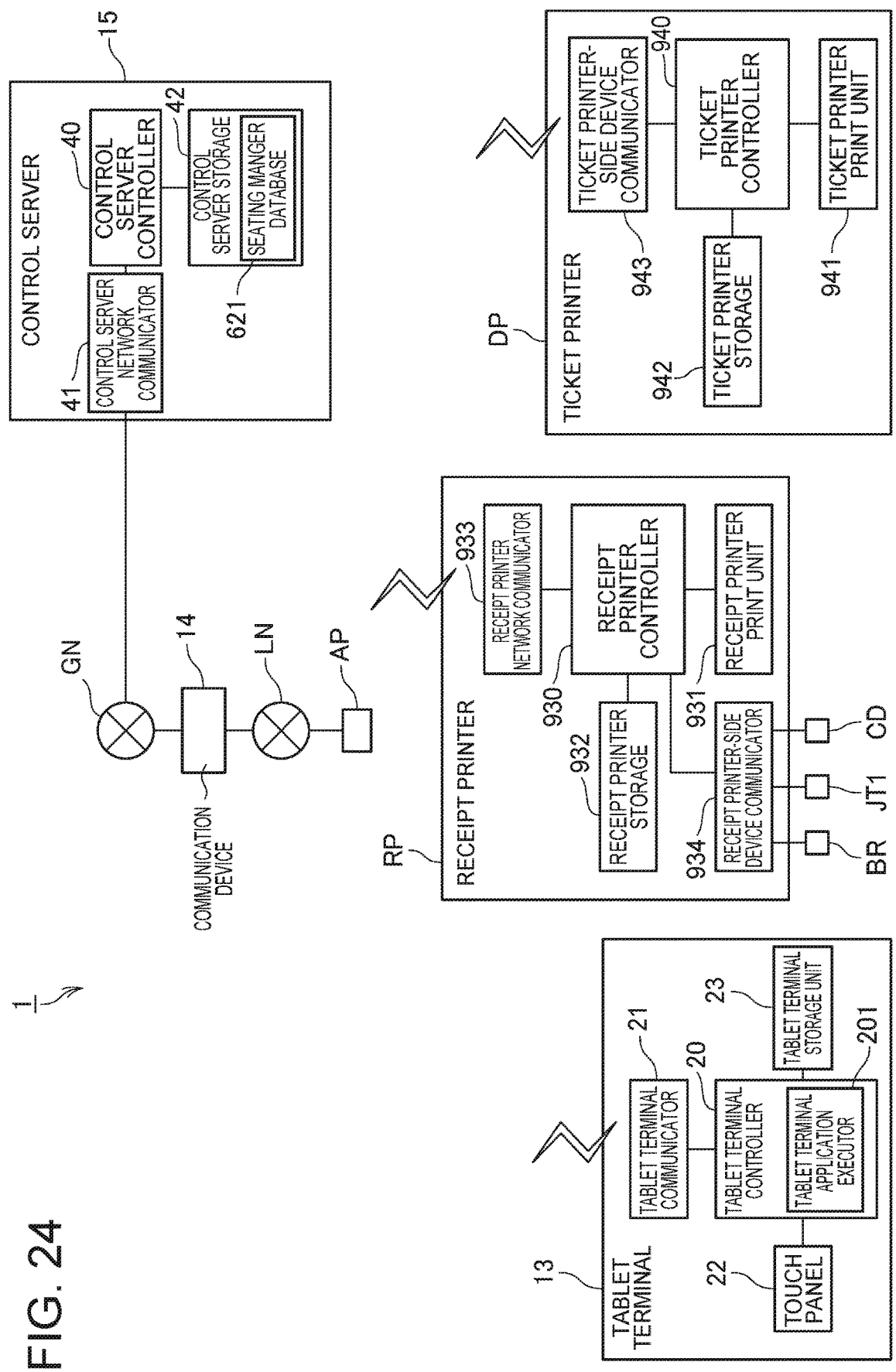
FIG. 24 is a block diagram illustrating the functional configuration of devices in the network system.

FIG. 24 is a block diagram illustrating the functional configuration of devices in the network system 901.

The configuration, function, and processes based on the functions of the tablet terminals 13 and control server 15 are as described in the first embodiment above, and differences from the first embodiment are described below.

The tablet terminal communicator 21 of the tablet terminal 13 communicates with devices connected to the local area network LN according to a specific communication protocol as controlled by the tablet terminal controller 20.

The tablet terminal communicator 21 also communicates with devices connected to the global network GN according to a specific communication protocol as controlled by the tablet terminal controller 20.

The receipt printer RP is a thermal line printer that stores roll paper, and prints images on the stored roll paper by forming dots with a thermal line head.

As shown in FIG. 24, the receipt printer RP includes a receipt printer controller 930, a receipt printer print unit or receipt printer print mechanism 931, receipt printer storage 932, receipt printer network communicator 933, and a receipt printer-side device communicator 934.

The receipt printer controller 930 includes a CPU, ROM, RAM, and other peripheral circuits, and controls the receipt printer RP. The CPU controls parts of the receipt printer RP by reading and running firmware stored in ROM or other storage.

The receipt printer print unit 931 includes mechanisms related to printing on roll paper, such as a conveyance mechanism for conveying roll paper stored inside the cabinet of the receipt printer RP, a printing mechanism for forming dots and printing images on the roll paper with a thermal head, and a cutter mechanism for cutting the roll paper at a specific position. As controlled by the receipt printer controller 930, the receipt printer print unit 931 conveys the roll paper with the conveyance mechanism, prints receipt-related images on the roll paper by the printing mechanism while, and then cuts the roll paper at a specific position with the cutter mechanism, producing a receipt.

The receipt printer storage 932 has nonvolatile memory, and stores data.

The receipt printer network communicator 933 communicates with the devices connected to the local area network LN according to a specific communication protocol as controlled by the receipt printer controller 930.

The receipt printer network communicator 933 also communicates with the devices connected to the global network GN according to a specific communication protocol as controlled by the receipt printer controller 930.

The receipt printer-side device communicator 934 includes an interface board with ports such as a USB port, a serial communication port other than a USB port, or other type of port. Devices can connect to each port of the interface board. The receipt printer-side device communicator 934 communicates with the devices connected to the receipt printer RP through the ports as controlled by the receipt printer controller 930.

Note that the receipt printer-side device communicator 934 may be configured with a wireless communication capability for communicating wirelessly with devices.

A barcode reader BR, customer display CD, and an automatic change machine JT1 are examples of devices connected to the receipt printer RP in this example.

The ticket printer DP is a thermal line printer that holds roll paper and forms dots on the stored roll paper with a line thermal head to print images.

As shown in FIG. 24, the ticket printer DP has a ticket printer controller 940, ticket printer print unit 941 (ticket printer print mechanism 941), ticket printer storage 942, and ticket printer-side device communicator 943.

The ticket printer controller 940 includes a CPU, ROM, RAM, and other peripheral circuits, and controls the ticket printer DP. The CPU controls parts of the ticket printer DP by reading and running firmware stored in ROM or other storage.

The ticket printer print unit 941 includes mechanisms related to printing on roll paper, such as a conveyance mechanism for conveying roll paper stored inside the cabinet of the ticket printer DP, a printing mechanism for forming dots and printing images on the roll paper with a thermal head, and a cutter mechanism for cutting the roll paper at a specific position. As controlled by the ticket printer controller 940, the ticket printer print unit 941 conveys the roll paper with the conveyance mechanism, prints receipt-related images on the roll paper by the printing mechanism while, and then cuts the roll paper at a specific position with the cutter mechanism, producing an order ticket.

The ticket printer storage 942 has nonvolatile memory, and stores data.

The ticket printer-side device communicator 943 communicates with the devices connected to the local area network LN according to a specific communication protocol as controlled by the ticket printer controller 940.

The ticket printer-side device communicator 943 also communicates with the devices connected to the global network GN according to a specific communication protocol as controlled by the ticket printer controller 940.

The control server 15 is a server of which the receipt printer RP, ticket printer DP, and other devices are clients.

As shown in FIG. 24, the control server 15 has a control server controller 40, control server network communicator 41, and control server storage 42. The basic configuration of the control server 15 is the same as in the first embodiment, but the data stored in the control server storage 42 differs.

The control server storage 42 has nonvolatile memory, and stores data (including a seating manger database 621).

Operation of devices in the network system 901 when a printer P prints as controlled by the tablet terminal 13 is described next.

Figure 25:
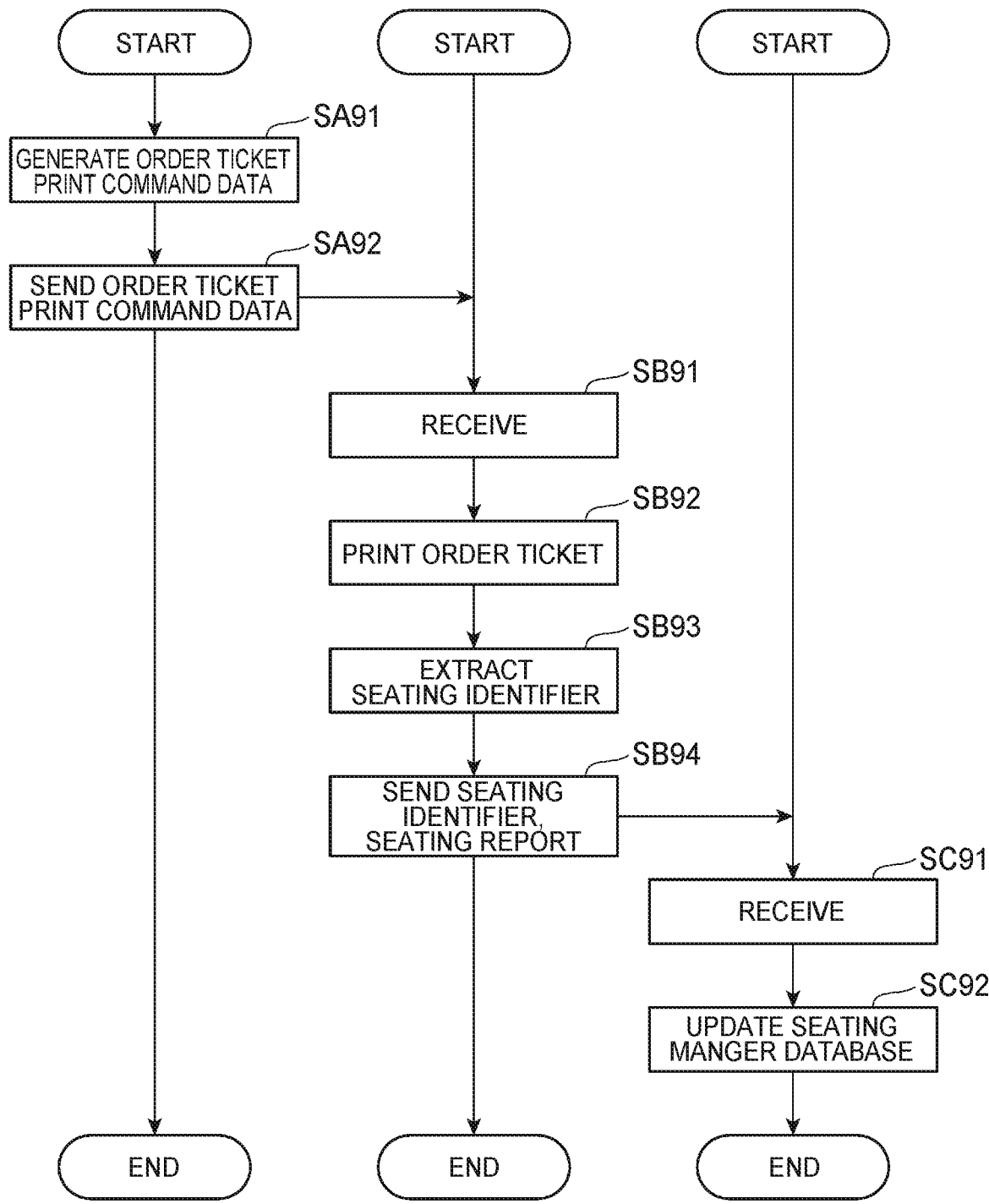
FIG. 25 is a flow chart of the operation of the tablet terminal, ticket printer, and control server.

FIG. 25 is a flow chart of the operation of devices in the network system 901 when a customer places an order at seating S, and an order ticket is printed by the ticket printer DP as controlled by the tablet terminal 13.

Below, a customer being seated at a seating S means that the customer is using the one seating S and can be served with food and drink or other service. In this case, the one customer occupies the one seating S, and other customers cannot use that same seating S.

Furthermore, that a customer vacates a seating S means that customer has ceased using that seating S. After the customer vacates the seating S, another customer can be seated at (can use) that seating S.

Before taking an order from a customer at a seating S, the waiter starts a specific application on the tablet terminal 13 and commands displaying a user interface (referred to below as an order input interface) for inputting orders. The tablet terminal application executor 201 then displays the order input interface on the touch panel 22 by a function of the specific application.

In addition to fields for inputting information corresponding to the order, the order input interface has a field for inputting a seating identifier.

The seating identifier is information identifying a particular seating S, and a unique seating identifier value is given to each seating S. If there are multiple shops using the network system 901, a unique seating identifier is assigned to each seating S in the plural shops.

To take an order from a customer occupying a particular seating S, the waiter goes to the seating S where the order is to be taken. Next, the waiter inputs the seating identifier of that seating S to the order input interface. Next, the waiter receives and inputs the order from the customer occupying the seating S to the order input interface displayed on the touch panel 22 of the tablet terminal 13, and confirms the input.

As shown in FIG. 25, when confirmation of input to the order input interface is detected, the tablet terminal application executor 201 of the tablet terminal 13 acquires the input information (seating identifier and order information), and based on the acquired information generates order ticket print command data (second control data) (step SA91).

The order ticket print command data is control data instructing printing an order ticket, and contains control commands in the command language of the ticket printer DP. At least the seating identifier and information corresponding to the order are printed on the order ticket. The order ticket print command data includes a control command instructing printing the seating identifier, and a control command instructing printing the order information (order content). An example of an order ticket is described below.

Next, the tablet terminal application executor 201 controls the tablet terminal communicator 21 to send the generated order ticket print command data to the ticket printer DP (step SA92).

Note that the communication information (the address of the ticket printer DP, the protocol used for communication, and the data format, for example) required for the tablet terminal 13 to transmit the order ticket print command data in step SA92 is previously registered in the tablet terminal 13.

As shown in FIG. 25, the ticket printer controller 940 of the ticket printer DP controls the ticket printer-side device communicator 943 to receive the order ticket print command data (step SB91).

Next, the ticket printer controller 940, based on the order ticket print command data, controls the ticket printer print unit 941 to print the order ticket (step SB92).

Figure 26:
FIG. 26 shows an example of an order ticket.

FIG. 26 shows an example of an order ticket.

As shown in FIG. 26, the seating identifier is printed on the order ticket. In the example in FIG. 26, the seating identifier is printed in area A51.

The order information printed on the order ticket includes, for each menu item ordered by the customer, a combination including information indicating the name of each menu item and the quantity ordered. In the example in FIG. 26, information indicating the order content is printed in area A52.

Next, the ticket printer controller 940 extracts the seating identifier from the order ticket print command data (step SB93).

Next, the ticket printer controller 940 controls the ticket printer-side device communicator 943 to send the seating identifier extracted in step SB93 and a seating report to the control server 15 (step SB94).

A seating report is information reporting that a customer has occupied the seating S of the reported seating identifier. In this example, a customer is determined to have occupied a particular seating S at the point a waiter has received an order from a customer sitting at that seating S, and an order ticket printed with the seating identifier of that seating S is printed. A seating report is also information indicating that, at that time, a customer is seated at the seating S identified by the seating identifier.

Note that the seating identifier printed on the order ticket in step SB92, and the seating identifier transmitted in step SB94, are examples of a second seating identifier.

As shown in FIG. 25, the control server controller 40 of the control server 15 controls the control server network communicator 41 to receive the seating identifier and seating report (step SC91).

Next, the control server controller 40, based on the information received in step SC91, updates the seating manger database 621 stored in the control server storage 42 (step SC92). The process of step SC92 is described further below.

FIG. 27 shows an example of the content of the seating manger database 621.

As shown in FIG. 27, the seating manger database 621 has a record for each seating S, and each record stores a seating identifier and seat occupancy information.

The seat occupancy information is information indicating whether the corresponding seating S is occupied or not occupied, and the value thereof indicates the seating S is occupied (in use) (shown in FIG. 27 as "occupied", referred to below as the "occupied value"), or the seating S is not occupied (open) (shown in FIG. 27 as "available", referred to below as the "not-occupied value").

The seating identifier stored each record of the seating manger database 621 is an example of a third seating identifier.

In step SC92, the control server controller 40 finds in the records of the seating manger database 621 the record storing a seating identifier of the same value as the seating identifier received in step SC91.

Next, the control server controller 40 updates the value of the seat occupancy information in the found record to the occupied value. As a result, if the value of the seat occupancy information is the not-occupied value, the not-occupied value is changed to the occupied value, and if the value of the seat occupancy information is the occupied value, the occupied value is maintained.

The value of the seat occupancy information in the record for the related seating S changes from the not-occupied value to the occupied value in the following circumstances.

As will be understood below, when the customer that used that seating S completes payment, the process described below is executed by devices of the network system 901, and the value of the seat occupancy information in the record for the seating S used by the customer is changed to the not-occupied value. When a new customer then takes that seating S and the first order is received from that new customer, the devices of the network system 901 execute the process described in the flow chart in FIG. 25, and the value of the seat occupancy information in the record for that seating S is changed from the not-occupied value to the occupied value.

The value of the seat occupancy information in the record for a particular seating S is held at the occupied value under the following circumstances.

Specifically, when a second or subsequent order is received from the customer using a particular seating S, and the process of step SC92 is executed, the value of the seat occupancy information is already set to the occupied value when the process of step SC92 is executed, and the process of step SC92 therefore keeps the value of the seat occupancy information in the record for that seating S set to the occupied value.

Figure 28:
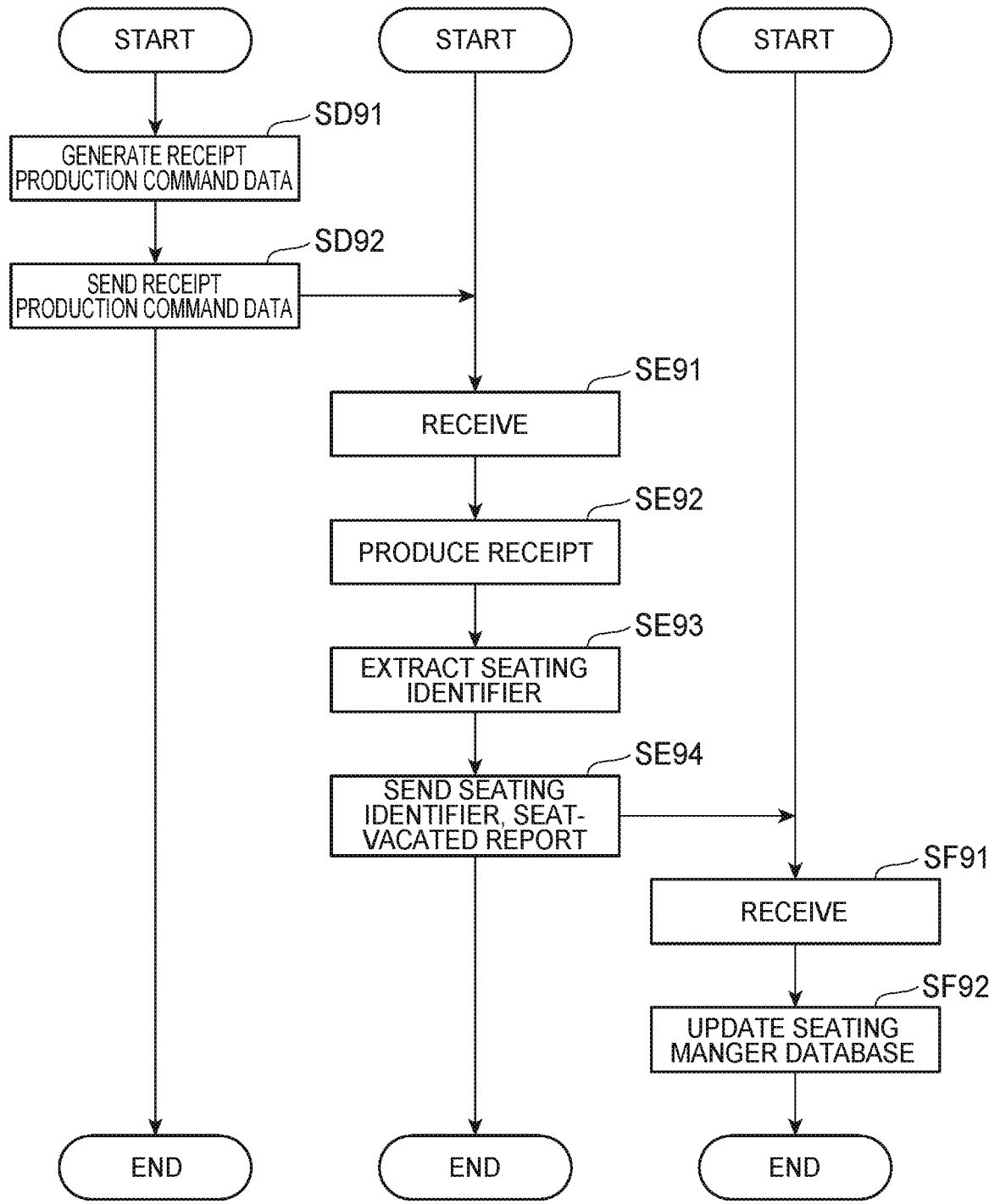
FIG. 28 is a flow chart of the operation of the tablet terminal, receipt printer, and control server.

FIG. 28 is a flow chart of the operation of devices in the network system 901 when a customer vacates the seating S and makes payment, and the receipt printer RP issues a receipt as controlled by the tablet terminal 13.

Before the customer that vacates an occupied seating S and makes payment, the waiter, for example, starts a specific application on the tablet terminal 13 to display a user interface for inputting payment information (referred to below as the transaction input interface). The tablet terminal application executor 201 displays the transaction input interface on the touch panel 22 by a function of the specific application.

The transaction input interface has fields for inputting transaction-related information, and a field for inputting the seating identifier.

When the customer that vacated a seating S makes payment, the waiter inputs the seating identifier of the specific seating S to the transaction input interface at the checkout counter LC. Next, the waiter inputs transaction information to the transaction input interface, and reads a specific barcode with the barcode reader BR as may be necessary.

The tablet terminal application executor 201 acquires the information input to the transaction input interface, communicates with the receipt printer RP to acquire the resulting of reading a barcode with the barcode reader BR, communicates with a server not shown that stores information required to process the transaction as necessary, and generates receipt production command data (first control command) (step SD91).

The receipt production command data is control data instructing producing a receipt, and comprises control commands in the command language of the receipt printer RP. At least the seating identifier and transaction-related information are printed on the receipt. The transaction-related information includes, for example, information related to the menu items ordered by the customer, subtotal information, tax information, and total amount information. The receipt production command data includes a control command instructing printing the seating identifier, and a control command instructing printing the transaction-related information. An example of a receipt is described below.

Next, the tablet terminal application executor 201 controls the tablet terminal communicator 21 to send the generated receipt production command data to the receipt printer RP (step SD92).

The information required for the tablet terminal 13 to transmit the receipt production command data to the receipt printer RP in step SD92 (such as the address of the receipt printer RP, the communication protocol to use, the data format) is previously registered in the tablet terminal 13.

As shown in FIG. 28, the receipt printer controller 930 of the receipt printer RP controls the receipt printer network communicator 933 to receive the receipt production command data (step SE91).

Next, the receipt printer controller 930, based on the receipt production command data, controls the receipt printer print unit 931 to produce a receipt (step SE92).

FIG. 29 shows an example of a receipt.

As shown in FIG. 29, the seating identifier is printed on the receipt. In the example in FIG. 29, the seating identifier is printed in area A81.

Transaction-related information is also printed on the receipt. In the example in FIG. 29, the transaction-related information is printed in area A82.

Next, the receipt printer controller 930 extracts the seating identifier from the receipt production command data (step SE93).

Next, the receipt printer controller 930 controls the receipt printer network communicator 933 to send the seating identifier extracted in step SE93 and the seat-vacated report to the control server 15 (step SE94).

The seat-vacated report is information reporting that the customer vacated the seating S of the seating identifier. The seating S used by the customer is considered vacated when the customer using that seating S completes payment. The seat-vacated report is information indicating that, at that time, the customer that occupied the seating S of the seating identifier has vacated the seating S.

Note that the seating identifier printed on the receipt in step SE92, and the seating identifier transmitted in step SE94, are both examples of a first seating identifier.

As shown in FIG. 28, the control server controller 40 of the control server 15 controls the control server network communicator 41 to receive the seating identifier and the seat-vacated report (step SF91).

Next, the control server controller 40, based on the information received in step SF91, updates the seating manger database 621 stored in the control server storage 42 (step SF92).

More specifically, in step SF92, the control server controller 40 finds in the records of the seating manger database 621 the record storing same seating identifier as the seating identifier received in step SF91. Next, the control server controller 40 updates the value of the seat occupancy information in the found record to the not-occupied value.

The value of the seat occupancy information for a particular seating S is thus changed to the not-occupied value when the customer that used the seating S vacates the seating S and another customer can use the same seating S.

Figure 30:
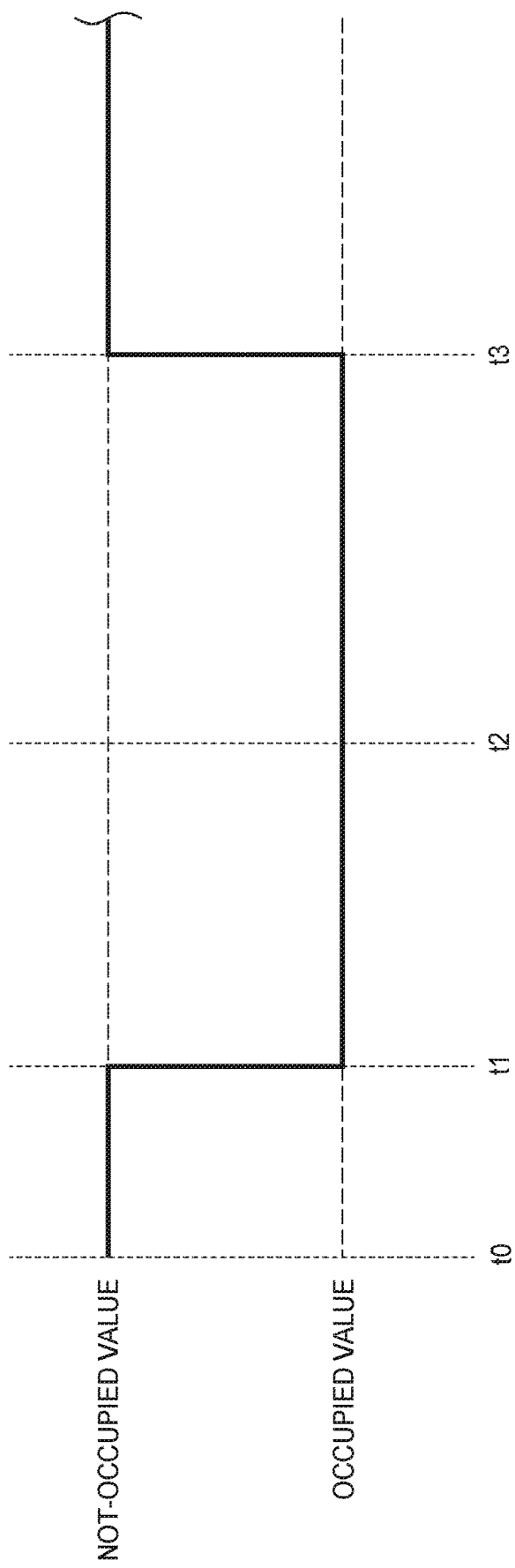
FIG. 30 is used to describe the timing when values of the seat occupancy information change.

FIG. 30 is used to describe the relationship between the timing when a customer places an order at a particular seating S, the timing when the customer that occupied that seating S completes the transaction, and the timing when the value of the seat occupancy information for that same seating S changes.

At t0 in FIG. 30, the value of the seat occupancy information is the not-occupied value, and the seating S is not being used by a customer.

As shown in FIG. 30, at time t1, a customer occupies the seating S, places a first order, and the value of the seat occupancy information changes to the occupied value.

A time t2, the same customer places a second order, and the value of the seat occupancy information remains set to the occupied value.

At time t3, the same customer vacates that seating S and makes payment, and the value of the seat occupancy information changes from the occupied value to the not-occupied value.

For the time from when a customer occupying a particular seating S places a first order until that customer vacates the seating S and completes payment, that seating S is used (occupied) by that customer, and cannot be used by another customer. From the time a first order is received from a customer occupying the seating S until the customer vacates the seating S and completes payment, that is, while a customer other than the first customer cannot use a particular seating S, the value of the seat occupancy information for a particular seating S is the occupied value.

As a result, when the seat occupancy information for a particular seating S is the occupied value, that seating S may be considered to be unusable by a customer other than the customer already at that seating S. If the seat occupancy information for a particular seating S is the not-occupied value, that seating S may be considered to be usable by a new customer.

An example of a process executed by the control server 15 based on the seating manger database 621 is described next.

Multiple Web APIs (Application Programming Interfaces) are stored on the control server 15. In response to access from an external device, the control server 15 can execute processes through the registered Web APIs and provide required information to users based on the seating manger database 621.

A process executed by the control server 15 to provide information when accessed from the tablet terminal 13 based on a command from a waiter (referred to below as the user) is described below.

The user starts the browser on the tablet terminal 13, and accesses a specific URL on the control server 15 to display a store identifier input screen (not shown in the figure). The user is previously informed of this URL by a specific method.

Below, the tablet terminal controller 20 runs the process by functions of the browser and other programs.

The tablet terminal controller 20 of the tablet terminal 13 accesses the specific URL on the control server 15 in response to the user command. In response to the specific URL being accessed, the control server controller 40 of the control server 15 sends an HTML file for displaying the store identifier input screen to the tablet terminal 13.

The tablet terminal controller 20 of the tablet terminal 13 then presents the store identifier input screen based on the received HTML file on the touch panel 22.

Note that while not described in detail below, when the control server 15 is accessed from the tablet terminal 13, authentication determining if the user is a person with the specific authority is performed appropriately by a specific method.

The store identifier input screen is a screen for inputting a store identifier, which is identification information identifying a particular store. A unique store identifier is previously assigned to each store in which a store system 902 of the network system 901 is deployed. A unique store identifier is therefore previously assigned to each restaurant T in this embodiment.

The user inputs the store identifier to the store identifier input screen, and confirms the input.

When confirmation of the input to the store identifier input screen is detected, the tablet terminal controller 20 of the tablet terminal 13 gets the store identifier that was input to the store identifier input screen.

Next, the tablet terminal controller 20, based on the acquired store identifier, generates an HTTP request, and sends the generated HTTP request to the control server 15. The browser executor 601 generates and sends the HTTP request by a function of a script embedded in the HTML file related to the store identifier input screen, for example.

The GET method is used on the request line of the HTTP request. The specific URL to access on the control server 15 is recorded as the pathname, and information specifying the specific corresponding Web API (referred to below as the specific Web API) is recorded according to a rule, on the request line of the HTTP request. The store identifier that is passed as a parameter to the specific Web API are also recorded according to a specific rule as a query parameter in the pathname.

The control server controller 40 of the control server 15 receives the HTTP request of the specific Web API that the tablet terminal 13 sent.

Next, the control server controller 40 executes the following process based on functions of the Web API specified by the received HTTP request.

More specifically, the control server controller 40 acquires the seating identifier of each seating S in the store of the store identifier based on the store identifier passed in the query parameter. While not shown in the figures, the control server 15 stores a database relationally storing the store identifier of the store where the seatings S are located, and the seating identifier of each seating S, and the control server controller 40 executes the foregoing process based on this database.

Next, the control server controller 40 finds in the records of the seating manger database 621 the record holding the acquired seating identifier (if there are multiple records, each of the multiple records).

Next, the control server controller 40, based on the retrieved one or multiple records, generates response data recording the seating identifier and seat occupancy information in a specific format for each seating S in the corresponding record. The response data is in a JSON (JavaScript® Object Notation) format, XML format, or other data format in which information is stored in hierarchical pairs of items and item values.

Next, the control server controller 40 sends the generated response data to the tablet terminal 13 in an HTTP response.

The tablet terminal controller 20 of the tablet terminal 13 then receives the HTTP response sent by the control server 15.

Next, the tablet terminal controller 20, based on the response data contained in the received HTTP response, presents seat availability display screen G9101 displaying information indicating the occupancy (availability) of each seating S in the store (restaurant T in this example).

Figure 31:
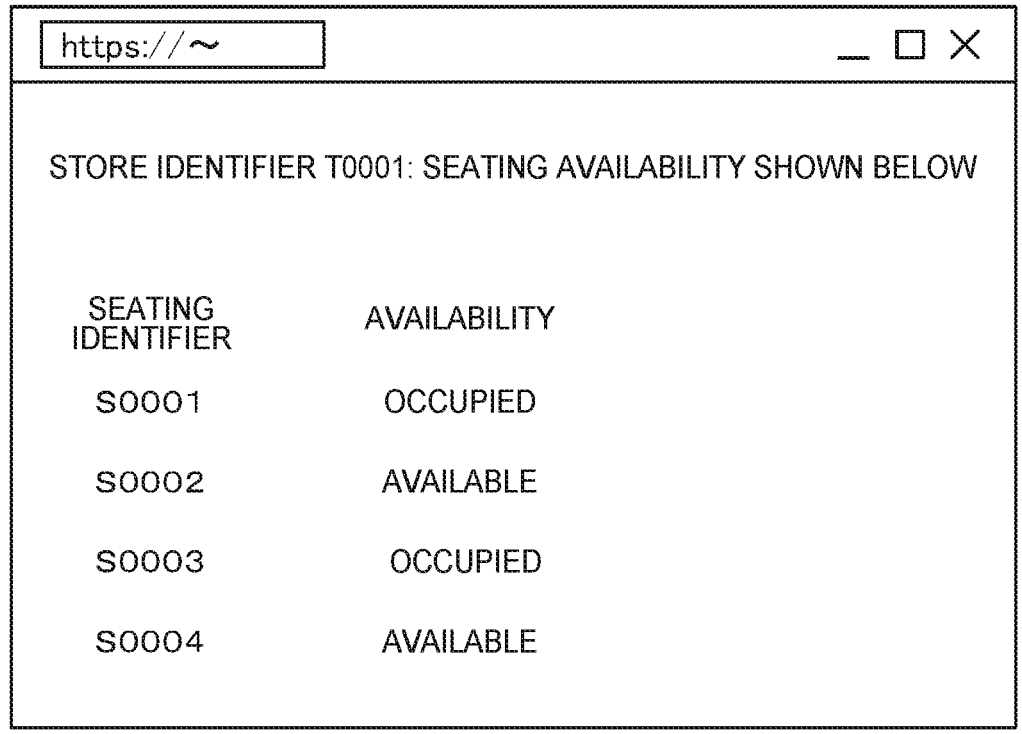
FIG. 31 shows an example of seat availability display screen.

FIG. 31 shows an example of a seat availability display screen G9101.

As shown in FIG. 31, the seat availability display screen G9101 displays, for each seating S in the store specified by the user, the seating identifier and information indicating whether or not the seating S is occupied or not.

By referring to the seat availability display screen G9101, the user can easily and accurately know if a particular seating S is occupied. By referring to the seat availability display screen G9101 when a new customer enters the restaurant T, the user can appropriately guide the customer to a seating S.

As described above, the network system 901 in this embodiment includes a receipt printer RP, ticket printer DP, and a control server 15 (server) that can connect to the printers P.

The receipt printer RP is used in a store having multiple seatings S that can be used by customers, and based on received receipt production command data (first control commands), produces receipts recording at least transaction-related information a seating identifier identifying the seating S used by the customer.

The ticket printer DP is also disposed in the store and, based on received order ticket print command data (second control commands), prints order tickets recording at least information indicating the content of orders placed by the customer using a seating S, and the seating identifier of the seating S used by the customer.

When receipt production command data is received, the receipt printer RP sends the seating identifier to the control server 15 based on the received receipt production command data.

When order ticket print command data (second control commands) is received, the ticket printer DP sends the seating identifier to the control server 15 based on the order ticket print command data that was received.

Based on the received seating identifier, the control server 15 manages use of seating S in the store by customers.

The control server 15 in this configuration acquires the seating identifier of a seating when a customer occupying a seating places an order, and when a customer that occupied a seating makes payment. Based on the received seating identifier, the control server 15 can therefore manage seating from when a customer occupies a particular seating to when the customer pays, and can accurately manage use of seating in the store.

The control server 15 in this example relationally stores, for each seating S in the store, a seating identifier and seat occupancy information, the seat occupancy information being set to a value (occupied value) indicating the corresponding seating S is in use, or a value (not-occupied value) indicating the corresponding seating S is not in use. The control server 15 sets the value of the seat occupancy information corresponding to the received seating identifier to the occupied value when a seating identifier is received from the ticket printer DP, and sets the value of the seat occupancy information corresponding to the received seating identifier to the not-occupied value when a seating identifier is received from the receipt printer RP.

The control server 15 in this configuration can accurately manage seating use based on the seat occupancy information relationally stored to the seating identifier.

The control server 15 in this configuration also sends information indicating the use of seating S in the store to an external device such as a tablet terminal 13, and displays information indicating seating use on the external device.

This enables the user to easily and accurately know the current use of seating by referring to the information displayed on the external device.

Other Embodiments

Variations of the foregoing embodiments are described below.

The seating manger database 621 in the above embodiment stores, relationally to seating identifiers, seat occupancy information indicating whether or not seating S is being used. Using the seating manger database 621, the control server 15 can manage, by seating S unit, whether or not seating S is being used.

A store may, however, allow shared use of a single seating S. More specifically, multiple different parties. Note that in this example a party is not limited to a group of plural individuals, and a party may comprise only one person.

Devices in the network system 901 may therefore be configured to execute the process described below.

In the embodiment described above, the seating manger database 621 stores, relationally to seating identifiers. seat occupancy information indicating whether or not seating S is being used.

In this example the seating manger database 621 stores, relationally to the seating identifier, seat occupancy information containing the following information. Specifically, the seat occupancy information in this example includes information indicating the maximum number of people that are allowed to occupy a particular seating S (referred to below as the maximum number information), information indicating the number of people that can use empty seats at a particular seating S (referred to below as the available seat count). The number of people indicated by the available seat count is equal to the number of people indicated by the maximum number information minus the number of customers using the seating S.

In this example, the receipt printer controller 930 of the receipt printer RP sends, when producing a receipt, the seating identifier and information indicating the number of people that left the seating S.

Note that, for example, if information indicating the number of people that left the seating S is printed on the receipt, the receipt printer controller 930, based on the receipt production command data, acquires the information indicating the number of people that left the seating S. If information indicating the number of people that left the seating S is not printed on the receipt, the receipt printer controller 930 prompts the waiter or other user to input the information acquires the information from the user input.

When a seating identifier and information indicating the number of people that left the seating S is received from the receipt printer RP, the control server controller 40 of the control server 15 updates the available seat count in the seat occupancy information based on the information indicating the number of people that left the seating S.

More specifically, when a specific number of people leave particular seating S, a number of available seats equal to the number of people that left the seating S is created at that seating S, and new customers equal to that specific number of people can be seated at that seating S. In this event, the control server controller 40 adds to the available seat count a value corresponding to the number of people indicated by the information indicating the number of people that left the seating S.

In another example, the ticket printer controller 940 of the ticket printer DP sends to the control server 15 the seating identifier and information indicating the number of people at a seating S when producing an order ticket. Note that, for example, if information indicating the number of people occupying the seating S is printed on the order ticket, the ticket printer controller 940, based on the order ticket print command data, acquires the information indicating the number of people occupying the seating S. If information indicating the number of people occupying the seating S is not printed on the order ticket, the ticket printer controller 940 prompts the waiter or other user to input the information acquires the information from the user input.

When a seating identifier and information indicating the number of people occupying the seating S is received from the ticket printer DP, the control server controller 40 of the control server 15 updates the available seat count in the seat occupancy information based on the information indicating the number of people occupying the seating S.

More specifically, when a specific number of people occupy a particular seating S, a number of people equal to the number of people that occupied the seating S cannot be seated. In this event, the control server controller 40 subtracts from the available seat count a value corresponding to the number of people indicated by the information indicating the number of people that were seated at the seating S.

In another example, by the control server 15, receipt printer RP, and ticket printer DP executing the foregoing processes, the available seat count of the seat occupancy information stored in the seating manger database 621 of the control server 15 appropriately reflects the actual number of available seats at the corresponding seating S. As a result, the control server controller 40 of the control server 15, based on the seat occupancy information, can appropriately manage seating S availability.

In response to a query from an external device such as the tablet terminal 13, the control server 15 can also provide information indicating the number of people that can use seats available at a particular seating S.

For example, the control server 15 executes the following process when queried for the store identifier by an external device. Based on the seating manger database 621, the control server controller 40 of the control server 15 in this process displays on the external device a user interface showing, for each seating S in the store identified by the store identifier, the seating identifier and information indicating the number of available seats where new customers may be seated.

The invention is described above with reference to a preferred embodiment thereof, but the invention is not limited thereto and can be modified and adapted in many ways without departing from the scope of the accompanying claims.

For example, the control methods of the foregoing transaction processing system 1 or 701, and the control method of the foregoing network system 901, may be embodied using a computer of any suitable device in the transaction processing system 1 or 701, or network system 901, an external device connected to the suitable device. In this configuration, the invention can be embodied as a program executed by a computer capable of executing the method, a recording medium recording the program readably by the computer, or a communication medium that communicates the program. Examples of such recording media include magnetic recording media, optical recording media, and semiconductor memory devices.

More specifically, the recording medium may be a removable or fixed storage medium such as floppy disk, HDD (Hard Disk Drive), CD-ROM (Compact Disk Read Only Memory), DVD (Digital Versatile Disk), Blu-ray® Disc, magneto-optical disc, flash memory, and memory card media. The recording medium may also be an internal storage device of the suitable device or external device connected to the suitable device, including RAM (Random Access Memory) and nonvolatile storage devices such as ROM (Read Only Memory) or HDD.

Specific examples of information stored in records of the transaction information manager database 421, attendance manager database 422, and store database 423 in the first embodiment are described above. Specific examples of information stored in records of the transaction information manager database 421, camera manager database 7422, and drawer manager database 7423 in the second embodiment are also described above. Specific examples of information stored in records of the seating manger database 621 in the third embodiment are also described above. The information stored in these databases is not limited to the foregoing, and may be changed as desired.

Furthermore, the tablet terminal 13 that functions as a host computer communicates wirelessly with printer 12 or other printer P in the foregoing embodiments. However, communication between the printer 12 or printer P and host computer is not limited to wireless communication, and may be configured to communicate by wire using a wired LAN communication standard, USB or serial communication standard other than USB, or wired communication using a parallel communication standard. The host computer is also not limited to a tablet terminal 13 or other tablet-type device, and may be a desktop device, for example.

In the second embodiment described above, the control server controller 40 transmits a command to start imaging, and the camera controller 50 generates and sends, to the control server 15, video data from the images captured during a specific time in response to the command. However, the camera 16 may be configured to record and store video data continuously, the control server controller 40 configured to send a command instructing starting transmitting the video data instead of instructing starting imaging, and the camera controller 50 configured to transmit the stored video data for a period of time specified in the transmission command to a control server. Alternatively, video data may be transmitted from a specific time before the command instructing video transmission is received. This enables more reliably checking adding and removing money by the checkout clerk during a transaction.

The store system 902 in the network system 901 according to the third embodiment of the invention is described using the example of a restaurant, but the type of business in which the network system 901 is used is not limited to restaurants.

The ticket printer DP is configured to extract the seating identifier from the order ticket print command data above, but the ticket printer DP may transmit the order ticket print command data to the control server 15, and the control server 15 may be configured to extract the seating identifier.

Likewise, the receipt printer RP is configured to extract the seating identifier from the receipt production command data above, but the receipt printer RP may transmit the receipt production command data to the control server 15, and the control server 15 may be configured to extract the seating identifier.

The printer P is also a thermal printer above, but the printing method of the printer P is not specifically limited.

Furthermore, one seating S includes one table TB and one or more chairs CH above. However, the type of seating S is not specifically limited. For example, an identifier may be assigned to each chair CH where customer can sit, and seating S availability may be managed by individual chairs CH. Furthermore, in bars and other restaurants having counters where individuals can sit alone at the counter, an identifier may be assigned to each seat and seating S availability may be managed by seat. In other words, seating S may be any object that is used by customers and for which use by customers is managed.

The function blocks described above with reference to the figures can be embodied as desired by the cooperation of hardware and software, and do not suggest a specific hardware configuration.

The function blocks shown in the function block diagrams illustrate the functional configuration of devices, and do not limit the specific configuration. More specifically, hardware corresponding to the function blocks in the figures is not required, and the functions of multiple function units can obviously be embodied by a single processor executing one or more programs. Furthermore, some functions embodied by software in the foregoing embodiments may be embodied by hardware, and some functions embodied by hardware in the foregoing embodiments may be embodied by software.

What is claimed is:

1. An information processing device connected to a printing device and an external device, the information processing device comprising:
   a network communicator configured to:
   communicate with the printing device and the external device; and
   receive a receipt production command data and an attendance sheet production data transmitted by the printing device;
   at least one processor being operable as a controller configured to:
   extract transaction information from the receipt production command data for instructing the printing device to print a receipt; and
   extract attendance information from the attendance sheet production data for instructing the printing device to print the attendance information; and
   at least one memory coupled to the at least one processor, the at least one memory operable as an attendance manager database and a transaction information manager database, the at least one memory configured to:
   store the transaction information in the transaction information manager database;
   store the attendance information in the attendance manager database,
   wherein the controller is further configured to:
   based on data included within the attendance manager database and data included within the transaction information manager database, execute a process in response to receiving a command from the external device,
   send information indicating a process result to the external device;
   cause a graphical representation to be displayed on a display, wherein the graphical representation graphically plots collected information as recorded over a designated time period, wherein the collected information includes the attendance information and the transaction information during the designated time period, and wherein at least some of the attendance information is shown as visually overlapping at least some of the transaction information in the graphical representation,
   wherein, the command from the external device includes response request information and requesting information.

2. The information processing device described in claim 1, wherein:
   the attendance manager database stores, based on the attendance sheet production data, an employee identifier identifying an employee relationally to the attendance information; and
   the controller, when a second command from the external device includes a second response request information including the employee identifier and requesting information indicating a second process result, is configured to extract the attendance information related to an attendance of the employee from the attendance manager database, and to generate and send second information indicating the second process result based on the extracted attendance information related to the attendance of the employee to the external device.

3. The information processing device described in claim 1, further comprising:
   a plurality of stored APIs (Application Programming Interfaces);

the response request information includes API call information specifying an API which is one of the plurality of stored APIs; and the controller generates the information indicating the process result by the API specified by the API call information.

4. The information processing device described in claim 1, wherein:

the printing device prints the attendance information based on the attendance sheet production data.

5. A control method of an information processing device connected to a printing device and an external device, the control method comprising:

receiving an attendance sheet production data transmitted by the printing device, where the attendance sheet production data instructs the printing device to print attendance information;

extracting the attendance information from the attendance sheet production data;

storing the attendance information based on the attendance sheet production data in an attendance manager database;

receiving a receipt production command data transmitted by the printing device, where the receipt production command data instructs the printing device to print a receipt;

extracting transaction information from the receipt production command data;

storing the transaction information in the transaction information manager database;

in response to a command from the external device, executing a process that is dependent on the attendance information and the transaction information, and sending information indicating a process result to the external device; and causing a graphical representation to be displayed on a display, wherein the graphical representation graphically plots collected information as recorded over a designated time period, wherein the collected information includes the attendance information and the transaction information during the designated time period, and wherein at least some of the attendance information is shown as visually overlapping at least some of the transaction information in the graphical representation.

* * * * *